(12) United States Patent
Zhou

(10) Patent No.: US 6,909,752 B2
(45) Date of Patent: Jun. 21, 2005

(54) CIRCUIT AND METHOD FOR GENERATING FILLER PIXELS FROM THE ORIGINAL PIXELS IN A VIDEO STREAM

(75) Inventor: Qinggang Zhou, Chapel Hill, NC (US)

(73) Assignee: Equator Technologies, Inc., Campbell, CA (US)

( * ) Notice: Subject to any disclaimer, the term of this patent is extended or adjusted under 35 U.S.C. 154(b) by 683 days.

(21) Appl. No.: 09/775,873

(22) Filed: Feb. 1, 2001

(65) Prior Publication Data

US 2002/0047930 A1 Apr. 25, 2002

Related U.S. Application Data

(63) Continuation-in-part of application No. PCT/US99/17606, filed on Aug. 3, 1999.
(60) Provisional application No. 60/095,201, filed on Aug. 3, 1998.

(51) Int. Cl.[7] .......................... H04N 7/12; H04N 11/02; H04N 11/04
(52) U.S. Cl. .............................. 375/240.21; 375/240.29
(58) Field of Search ........................ 375/240.11–240.21

(56) References Cited

U.S. PATENT DOCUMENTS

| | | | |
|---|---|---|---|
| 4,472,732 A | | 9/1984 | Bennett et al. |
| 5,473,383 A | | 12/1995 | Sezan et al. |
| 5,521,644 A | | 5/1996 | Sezan et al. |
| 5,621,467 A | | 4/1997 | Chien et al. |
| 5,712,687 A | * | 1/1998 | Naveen et al. ............... 348/453 |
| 5,745,183 A | * | 4/1998 | Lam ...................... 375/240.15 |
| 5,784,114 A | | 7/1998 | Borer et al. |
| 5,793,435 A | * | 8/1998 | Ward et al. .................. 348/448 |
| 5,920,356 A | * | 7/1999 | Gupta et al. ................ 348/606 |
| 6,094,232 A | * | 7/2000 | Bayazit et al. .............. 348/616 |
| 6,118,488 A | * | 9/2000 | Huang ........................ 348/452 |
| 6,307,888 B1 | * | 10/2001 | Le Clerc ................ 375/240.29 |
| 6,459,454 B1 | * | 10/2002 | Walters ....................... 348/448 |
| 6,690,427 B2 | * | 2/2004 | Swan .......................... 348/448 |

OTHER PUBLICATIONS

Vishal Markandey, et al., Motion Adaptive Deinterlacer For DMD (Digital Micromirror Device) Based Digital Television, IEEE Consumer Electronics, vol. 40, No. 3, 1994, pp. 735–742.

R. Simonetti, et al., "A Deinterlacer For IQTV Receivers And Multimedia Applications", IEEE Transactions on Consumer Electronics, vol. 39, No. 3, Aug., 1993, pp. 234–240.

* cited by examiner

*Primary Examiner*—Andy Rao
(74) *Attorney, Agent, or Firm*—Graybeal Jackson Haley LLP

(57) ABSTRACT

An image processing circuit includes a processor that receives a value of an original pixel of an original first video image and a value of an original pixel of an original second video image. The processor generates a first pixel-value component from the value of the original pixel of the first original video image, and generates a second pixel-value component from the value of the original pixel in the original second video image. From the first and second pixel-value components, the processor generates a value of a filler pixel, and combines the filler pixel and the original first video image to generate a resulting video image. One can use such an image processing circuit to generate a filler video field from an original video field and to merge the filler and original fields to generate a resulting video frame. Such an image processing circuit often uses less memory and detects inter-field motion more accurately than prior image processing circuits. Another aspect of the invention distinguishes thin lines from edges more accurately, and thus often produces fewer visual artifacts, than prior image processing circuits.

46 Claims, 20 Drawing Sheets

| FM 00 | FM 01 | FM 02 | FM 03 | FM 04 | FM 05 | ... | FM 0(x/2-1) | FM 0(x/2) |
|---|---|---|---|---|---|---|---|---|
| FM 10 | FM 11 | FM 12 | FM 13 | FM 14 | FM 15 | ... | FM 1(x/2-1) | FM 1(x/2) |
| FM 20 | FM 21 | FM 22 | FM 23 | FM 24 | FM 25 | ... | FM 2(x/2-1) | FM 2(x/2) |
| ... | | | ... | | | | | |
| FM (k/4-1)0 | FM (k/4-1)1 | FM (k/4-1)2 | FM (k/4-1)3 | FM (k/4-1)4 | FM (k/4-1)5 | ... | FM (k/4-1)(x/2-1) | FM (k/4-1)(x/2) |
| FM (k/4)0 | FM (k/4)1 | FM (k/4)2 | FM (k/4)3 | FM (k/4)4 | FM (k/4)5 | ... | FM (k/4)(x/2-1) | FM (k/4)(x/2) |

*Fig. 9*

| MT 00 | MT 01 | MT 02 | MT 03 | MT 04 | MT 05 | ... | MT 0(x/2-1) | MT 0(x/2) |
|---|---|---|---|---|---|---|---|---|
| MT 10 | MT 11 | MT 12 | MT 13 | MT 14 | MT 15 | ... | MT 1(x/2-1) | MT 1(x/2) |
| MT 20 | MT 21 | MT 22 | MT 23 | MT 24 | MT 25 | ... | MT 2(x/2-1) | MT 2(x/2) |
| ... | | | ... | | | | | |
| MT (k/4-1)0 | MT (k/4-1)1 | MT (k/4-1)2 | MT (k/4-1)3 | MT (k/4-1)4 | MT (k/4-1)5 | ... | MT (k/4-1)(x/2-1) | MT (k/4-1)(x/2) |
| MT (k/4)0 | MT (k/4)1 | MT (k/4)2 | MT (k/4)3 | MT (k/4)4 | MT (k/4)5 | ... | MT (k/4)(x/2-1) | MT (k/4)(x/2) |

| FM 00 | FM 01 | FM 02 | FM 03 | FM 04 | FM 05 | ⋯ ⋯ | FM 0(x/2-1) | FM 0(x/2) |
|---|---|---|---|---|---|---|---|---|
| FM 10 | FM 11 | FM 12 | FM 13 | FM 14 | FM 15 | ⋯ ⋯ | FM 1(x/2-1) | FM 1(x/2) |
| FM 20 | FM 21 | FM 22 | FM 23 | FM 24 | FM 25 | ⋯ ⋯ | FM 2(x/2-1) | FM 2(x/2) |
| | | | ⋯ | | | | | |
| FM(k/2)0 | FM(k/2)1 | FM(k/2)2 | FM(k/2)3 | FM(k/2)4 | FM(k/2)5 | ⋯ ⋯ | FM(k/2)(x/2-1) | FM(k/2)(x/2) |

| MT 00 | MT 01 | MT 02 | MT 03 | MT 04 | MT 05 | ⋯ ⋯ | MT 0(x/2-1) | MT 0(x/2) |
|---|---|---|---|---|---|---|---|---|
| MT 10 | MT 11 | MT 12 | MT 13 | MT 14 | MT 15 | ⋯ ⋯ | MT 1(x/2-1) | MT 1(x/2) |
| MT 20 | MT 21 | MT 22 | MT 23 | MT 24 | MT 25 | ⋯ ⋯ | MT 2(x/2-1) | MT 2(x/2) |
| | | | ⋯ | | | | | |
| MT(k/2)0 | MT(k/2)1 | MT(k/2)2 | MT(k/2)3 | MT(k/2)4 | MT(k/2)5 | ⋯ ⋯ | MT(k/2)(x/2-1) | MT(k/2)(x/2) |

CIRCUIT AND METHOD FOR GENERATING FILLER PIXELS FROM THE ORIGINAL PIXELS IN A VIDEO STREAM

This is a continuation-in-part of co-pending International Application PCT/US/99/17606 filed on Aug. 3, 1999 designating the United States, which claims the benefit of provisional application 60/095,201 filed on Aug. 3, 1998.

TECHNICAL FIELD

The invention relates generally to electronic circuits, and more particularly to a circuit and method for estimating the values of filler pixels from the values of original pixels in a video stream. For example, one can use the circuit or method to de-interlace an interlaced video stream. That is, from the original pixels in the original video fields, one can generate the values of filler pixels, form complementary filler video fields from the filler pixels, and combine the original and complementary fields to generate respective video frames.

BACKGROUND OF THE INVENTION

FIG. 1 is a diagram of an interlaced video frame 10, which includes an even video field 12 and an odd video field 14. The even field 12 includes the even lines a0, a2, a4 ... a(n-1) of the frame 10, and the odd field 14 includes the odd lines b1, b3, b5 ... bn of the frame 10. A video source (not shown) such as a video camera generates the even field 12 at a time $t_0$ and generates the odd field 14 at a subsequent time $t_1$, and a video display (not shown in FIG. 1) displays the fields 12 and 14 in the same sequence. For example, according to the National Television Standards Committee (NTSC) video standard, which has been in existence for over 50 years, a video source generates and a video display displays one field 12 or 14 every $\frac{1}{60}^{th}$ of a second, and thus respectively generates and displays one frame 10 every $\frac{1}{30}^{th}$ of a second. But even though the display displays the fields 12 and 14 at different times, the relatively slow frequency responses of the display and the human eye cause a viewer to perceive that the display is displaying the fields 12 and 14 simultaneously. Thus, the viewer perceives the frame 10 as a single image instead of two sequential partial images.

Many modern video applications, however, generate streams of non-interlaced, i.e., progressive, video frames. For example, most applications of the new High-Definition Television (HDTV) standards such as MPEG (Motion Pictures Experts Group) call for the generation and display of an entire frame 10 approximately every $\frac{1}{60}^{th}$ of a second. Because such MPEG video sources and displays respectively generate and display all the lines of a progressive frame at one time and not at two sequential times, progressive frames contain little if any motion blurring.

Because many existing video sources generate interlaced video, and because many existing video works are recorded in an interlaced format, one may wish to convert a stream of interlaced video frames into a stream of progressive video frames that are compatible with HDTV systems. For example, one may wish to convert a VHS signal from a VCR (not shown) into a progressive video signal for display on an HDTV display (not shown in FIG. 1).

Still referring to FIG. 1, a simple technique for de-interlacing the interlaced frame 10 is to merge the fields 12 and 14 into a resulting progressive frame that is displayed twice in a row at the frame-display rate. For example, in the MPEG standard described above, a display displays this resulting progressive frame and then displays it again $\frac{1}{60}^{th}$ of a second later. But because the fields 12 and 14 were generated at different times $t_0$ and $t_1$, the resulting progressive frame may contain blurred regions, particularly if there were changes in the image contents, i.e., motion, between the times $t_0$ and $t_1$. Thus unfortunately, this technique often results in a video stream of relatively poor visual quality by HDTV standards.

Another technique for de-interlacing the video frame 10 is to generate respective complimentary filler fields for the original fields 12 and 14. That is, for the even field 12, one "fills" the missing odd lines with odd filler lines, and for the odd field 14, one fills the missing even lines with even filler lines.

One approach to this filler technique is to spatially interpolate the filler pixels of the filler lines from the values of neighboring original pixels within the same field. This approach is typically most accurate when there is significant motion between the original fields. Unfortunately, many spatial interpolation approaches have a tendency to falsely interpolate a thin line as a directional edge, and thus introduce artifacts into the resulting progressive frame.

An alternative approach is to temporally interpolate the values of the filler pixels from the values of corresponding original pixels in adjacent complimentary original fields. This approach is typically most accurate when there is little or no motion between the original fields.

Because many interlaced video streams have some segments that exhibit significant inter-field motion and other segments that exhibit little or no inter-field motion, another approach, often called a hybrid approach, combines the spatial and temporal interpolation approaches. For example, one hybrid approach varies the relative weightings of the temporal and spatial interpolation approaches based on the magnitude of inter-field motion. The greater the magnitude of inter-field motion, the more heavily weighted the spatial interpolation approach; conversely, the lower the magnitude of inter-field motion, the more heavily weighted the temporal interpolation approach.

Unfortunately, many hybrid techniques sometimes fail to detect significant inter-field motion, and thus assign improper weightings to the spatial and temporal approaches. Although some of these techniques can be modified to overcome this defect, such modifications often require an impractical amount of memory.

Overview of Conventional Image-Compression Techniques

To help the reader more easily understand the concepts discussed below in the description of the invention, the following is a basic overview of the relevant aspects of conventional image-compression techniques.

To electronically transmit a relatively high-resolution image over a relatively low-band-width channel, or to electronically store such an image in a relatively small memory space, it is often necessary to compress the digital data that represents the image. Such image compression typically involves reducing the number of data bits necessary to represent an image. For example, High-Definition-Television (HDTV) video images are compressed to allow their transmission over existing television channels. Without compression, HDTV video images would require transmission channels having bandwidths much greater than the bandwidths of existing television channels. Or, to reduce data traffic and transmission time to acceptable levels, one may compress an image before sending it over the internet. In addition, to increase the image-storage capacity of a CD-ROM or server, on may compress an image before storing it.

Referring to FIGS. 2A–3D, the basics of the popular block-based MPEG compression standards, which include MPEG-1 and MPEG-2, are discussed. FIGS. 2A–2D illustrate compressing a Y-$C_B$-$C_R$ image (e.g., video frames or fields) according to an MPEG 4:2:0 format, and FIGS. 3A–3D illustrate compressing a Y-$C_B$-$C_R$ image according to an MPEG 4:2:2 format. But the discussed concepts also apply to other MPEG formats, to images that are represented in other color spaces, and to other block-based compression standards such as the Joint Photographic Experts Group (JPEG) standard, which is often used to compress still images. Although many details of the MPEG standards and the Y, $C_B$, $C_R$ color space are omitted for brevity, these details are well-known and are disclosed in a large number of available references including "Video Compression" by Peter D. Symes, McGraw-Hill, 1998, which is incorporated by reference. Furthermore, other well-known block-based compression techniques are available for encoding and decoding video and still images.

Referring to FIGS. 2A–2D, the MPEG standards are often used to compress temporal sequences of images—video frames for purposes of this discussion—such as found in a television broadcast. Each video frame is divided into sub-regions called macro blocks, which each include one or more pixels. FIG. 2A is a 16-pixel-by-16-pixel macro block 20 having 256 pixels 22 (not drawn to scale). In the MPEG standards, a macro block is always 16×16 pixels, although other compression standards may use macro blocks having other dimensions. In the original video frame, i.e., the frame before compression, each pixel 22 has a respective luminance value Y and a respective pair of color-, i.e., chroma-, difference values $C_B$ and $C_R$.

Before compression of the video frame, the digital luminance (Y) and chroma-difference ($C_B$ and $C_R$) values that will be used for compression, i.e., the original or pre-compression values, are generated from the original Y, $C_B$, and $C_R$ values of the original frame. In the MPEG 4:2:0 format, the pre-compression Y values are the same as the original Y values. Thus, each pixel 22 merely retains its original luminance value Y. But to reduce the amount of data to be compressed, the MPEG 4:2:0 format allows only one pre-compression $C_B$ value and one pre-compression $C_R$ value for each group 24 of four pixels 22. Each of these pre-compression $C_B$ and $C_R$ values are respectively derived from the original $C_B$ and $C_R$ values of the four pixels 22 in the respective group 24. For example, a pre-compression $C_B$ value may equal the average of the original $C_B$ values of the four pixels 22 in the respective group 24. Thus, referring to FIGS. 2B–2D, the pre-compression Y, $C_B$, and $C_R$ values generated for the macro block 20 are arranged as one 16×16 matrix 26 of pre-compression Y values (equal to the original Y values for each respective pixel 22), one 8×8 matrix 28 of pre-compression $C_B$ values (equal to one derived $C_B$ value for each group 24 of four pixels 22), and one 8×8 matrix 30 of pre-compression $C_R$ values (equal to one derived $C_R$ value for each group 24 of four pixels 22). The matrices 26, 28, and 30 are often called "blocks" of values. Furthermore, because it is convenient to perform the compression transforms on 8×8 blocks of pixel values instead of on 16×16 blocks, the block 26 of pre-compression Y values is subdivided into four 8×8 blocks 32a–32d, which respectively correspond to the 8×8 blocks A–D of pixels 22 in the macro block 20. Thus, referring to FIGS. 2A–2D, six 8×8 blocks of pre-compression pixel data are generated for each macro block 20; four 8×8 blocks 32a–32d of pre-compression Y values, one 8×8 block 28 of pre-compression $C_B$ values, and one 8×8 block 30 of pre-compression $C_R$ values.

FIGS. 3A–3D illustrate the generation of the pre-compression Y, $C_B$, $C_R$, values according to the MPEG 4:2:2 format. Referring to FIG. 3A, the pixels 22 of the macro block 20 are arranged in two-pixel groups 34 as compared to the four-pixel groups 24 (FIG. 2A) that the 4:2:0 format calls for. Referring to FIG. 3B, in the MPEG 4:2:2 format, the pre-compression Y values are the same as the original Y values. Thus, as in the 4:2:0 format, each pixel 22 merely retains its original luminance value Y. But referring to FIGS. 3C and 3D, to reduce the amount of data to be compressed, the MPEG 4:2:2 format allows only one pre-compression $C_B$ value and one pre-compression $C_R$ value for each group 34 of two pixels 22. Each of these pre-compression $C_B$ and $C_R$ values are respectively derived from the original $C_B$ and $C_R$ values of the two pixels 22 in the respective group 34. For example, a pre-compression $C_B$ value may equal the average of the original $C_B$ values of the two pixels 22 in the respective group 34. Therefore the 4:2:2 format calls for twice as many $C_B$ and $C_R$ values (one per every two original pixels) as the 4:2:0 format (one per every four pixels). Thus, referring to FIGS. 3B–3D, the pre-compression Y. $C_B$, and $C_R$ values generated for the macro block 20 of FIG. 3A are arranged as one 16×16 matrix 36 of pre-compression Y values (equal to the original Y values for each respective pixel 22), one 8×16 matrix 38 of pre-compression $C_B$ values (equal to one derived $C_B$ value for each group 34 of two pixels 22), and one 8×16 matrix 40 of pre-compression $C_R$ values (equal to one derived $C_R$ value for each group 34 of two pixels 22). As discussed above, because it is convenient to perform the compression transforms on 8×8 blocks of pixel values instead of 16×16 or 8×16 blocks, the block 36 of pre-compression Y values is subdivided into four 8×8 blocks 42a–42d, which respectively correspond to the 8×8 blocks A–D of pixels in the macro block 20. Likewise, the block 38 of pre-compression $C_B$ values is subdivided into two 8×8 blocks 44a and 44b, which correspond to the pairs of blocks A and B and C and D, respectively. Similarly, the block 40 of pre-compression $C_R$ values is subdivided into two 8×8 blocks 46a and 46b, which correspond to the pairs of blocks A and B and C and D, respectively. Thus, referring to FIGS. 3A–3D, eight 8×8 blocks of pre-compression pixel data are generated for each macro block 20: four 8×8 blocks 42a–42d of pre-compression Y values, two 8×8 blocks 44a–44b of pre-compression $C_B$ values, and two 8×8 blocks 46a–46a of pre-compression $C_R$ values.

SUMMARY OF THE INVENTION

In one aspect of the invention, an image processing circuit includes a processor that receives a value of an original pixel of an original first video image and a value of an original pixel of an original second video image. The processor generates a first pixel-value component from the value of the original pixel of the first original video image, and generates a second pixel-value component from the value of the original pixel in the original second video image. From the first and second pixel-value components, the processor generates a value of a filler pixel, and combines the filler pixel and the original first video image to generate a resulting video image.

One can use such an image processing circuit to generate a filler video field from an original video field and to merge the filler and original fields to generate a resulting video frame. Such an image processing circuit often uses less memory and detects inter-field motion more accurately than prior image processing circuits.

In another aspect of the invention, the processor of the image processing circuit receives first and second sets of pixel values for first and second respective groups of original pixels in an original video image. The processor calculates direction values from the first and second sets of pixel values for a filler pixel that is for disposition in the original video image between the first and second groups of original pixels. The processor generates a value for the filler pixel based on the calculated direction values.

One can use such an image processing circuit to spatially interpolate the filler-pixels of a filler field from the original pixels in an original field and to merge the filler and original fields to generate a resulting video frame. Such an image processing circuit often distinguishes thin lines from edges more accurately, and thus often produces fewer visual artifacts, than prior image processing circuits.

BRIEF DESCRIPTION OF THE DRAWINGS

FIG. 9 is a motion-value buffer for the filler fields of FIGS. 7 and 11 according to an embodiment of the invention.

FIG. 10 is a motion-trace buffer for the filler fields of FIGS. 7 and 11 according to an embodiment of the invention.

FIG. 11 is a diagram of two consecutive 4:2:0-formatted odd video fields from FIG. 6 and their respective even filler fields according to an embodiment of the invention.

FIG. 13 is a motion-value buffer for the filler fields of FIGS. 12 and 15 according to an embodiment of the invention.

FIG. 14 is a motion-trace buffer for the filler fields of FIGS. 12 and 15 according to an embodiment of the invention.

FIG. 15 is a diagram of two consecutive 4:2:2-formatted odd video fields from FIG. 6 and their respective even filler fields according to an embodiment of the invention.

FIGS. 18A–16E illustrate the possible direction vectors for the filler pixel of FIG. 17 according to an embodiment of the invention.

DETAILED DESCRIPTION OF THE INVENTION

Figure 4:
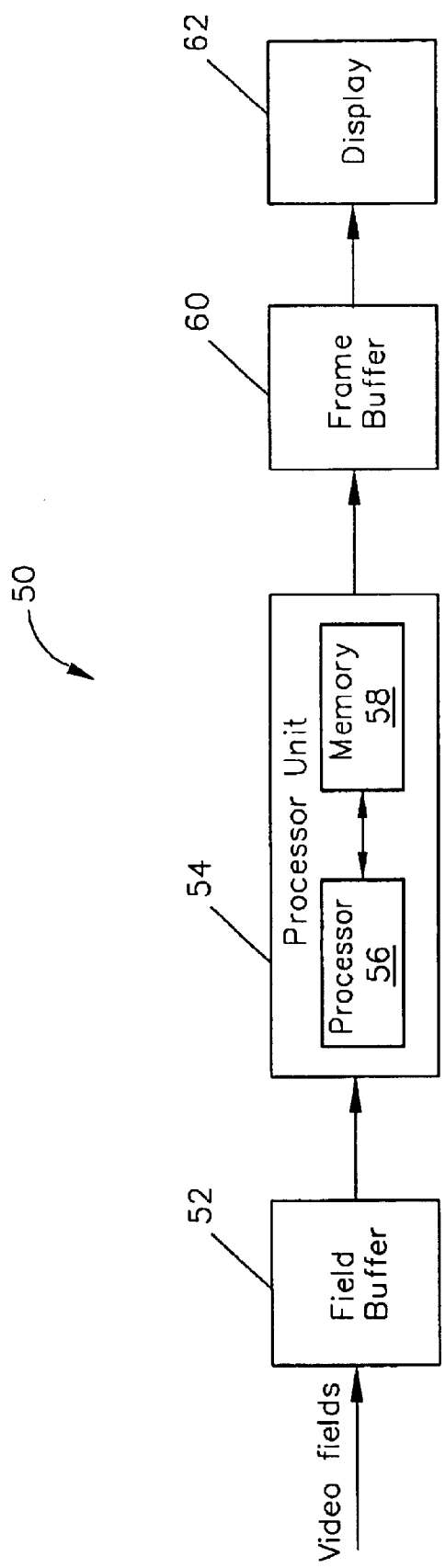
FIG. 4 is a block diagram of an image processing circuit according to an embodiment of the invention.

FIG. 4 is a block diagram of an image processing circuit 50 according to an embodiment of the invention. The circuit 50 can calculate the values of filler pixels from the original pixels in the original video fields, generate filler fields from the filler pixels, and merge the filler fields and original fields to generate resulting video frames. In one embodiment, the circuit 50 extends the influence, of detected inter-field motion to more filler fields than prior image processing circuits. Thus, the circuit 50 often generates more accurate filler fields and higher-quality resulting frames than prior circuits. In another embodiment, the circuit 50 uses less memory for storing motion information than many prior circuits. In yet another embodiment, the circuit 50 spatially interpolates thin lines and edges more accurately than many prior circuits, and this further increases the accuracy of the filler fields and the visual quality of the resulting frames.

The image processing circuit 50 includes a field buffer 52, which receives and stores one or more original video fields from a stream of original video fields. A processor unit 54 includes a processor 56 and a memory 58, generates filler fields from the original fields stored in the buffer 52, and merges the filler and original fields to generate respective resulting video frames. A frame buffer 60 stores the frames generated by the unit 54 and provides them for display on a video display 62. In one embodiment, the processor 56 is a Very Long Instruction Word (VLIW) processor manufactured by Equator Technologies of Seattle, Wash. In another embodiment, the unit 54 generates the resulting frames in a HDTV format and the display 62 is an HDTV display. In yet another embodiment, a high-capacity storage device such as a Digital Video Disk (DVD) replaces the frame buffer 60 and stores the resulting video frames for later display.

Figure 5:
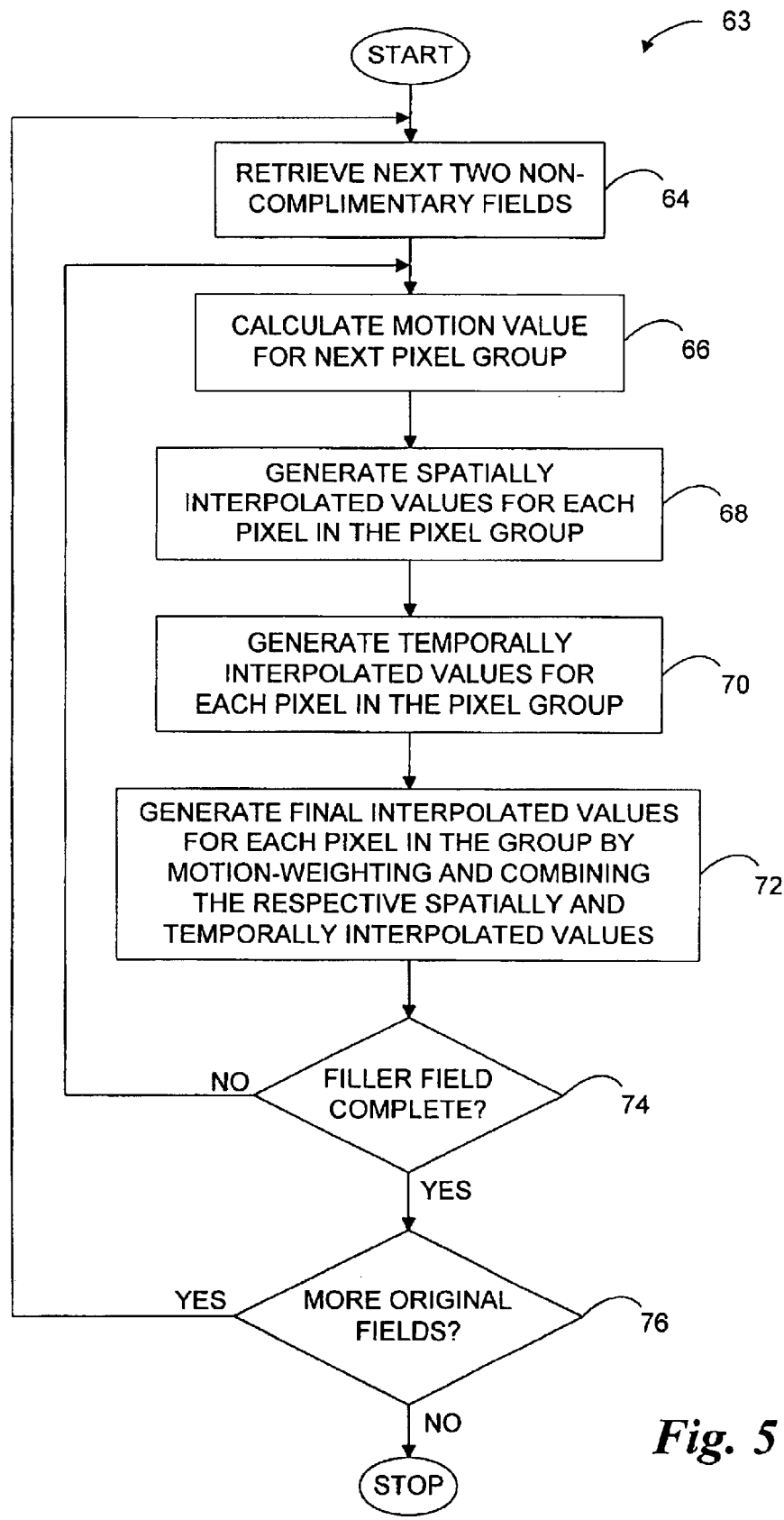
FIG. 5 is a flow diagram showing the general operation of the image processing circuit of FIG. 4 according to an embodiment of the invention.

Referring to FIG. 5, the operation of the image processing circuit 50 of FIG. 4 according to an embodiment of the invention is discussed in conjunction with the flow diagram 63.

Referring to block 64 of the flow diagram 63, the processor unit 54 retrieves from the field buffer 52 the values of the original pixels that respectively compose the next two original non-complimentary video fields in the sequence of original video fields.

Next, referring to block 66, from the retrieved values of the original pixels the processor 56 calculates a motion value for a group of filler pixels. This group includes one or more filler pixels that the processor 56 will merge with the first of the two non-complimentary original fields to form a resulting frame.

Referring to block 68, the processor 56 spatially interpolates a respective pixel value for each of the filler pixels in the group.

Referring to block 70, the processor 56 also temporally interpolates a respective pixel value for each filler pixel in the group.

Next, referring to block 72, the processor 56 calculates respective spatial and temporal weighting factors from the motion value and weights the spatially and temporally interpolated pixel values with these respective factors. The processor 56 then combines these weighted pixel values to generate a respective resulting pixel value for each filler pixel in the group. The processor unit 54 stores these resulting filler pixel values in the frame buffer 60, or stores them in the memory 58 until the processor 56 generates the entire filler field.

Referring to block 74, if the processor 56 must generate more filler-pixel values to complete the respective filler field, then the processor unit 54 returns to block 66. Conversely, referring to block 76, if the processor 56 has completed the current filler field but there are more original fields in the buffer 52, then the processor unit 54 returns to block 64. But if there are no more original fields in the field buffer 52, then the processor unit 54 halts filler-field generation.

Referring to FIGS. 6–18E, the steps of the flow diagram 153 of FIG. 5 are discussed in more detail according to an embodiment of the invention.

Figure 6:
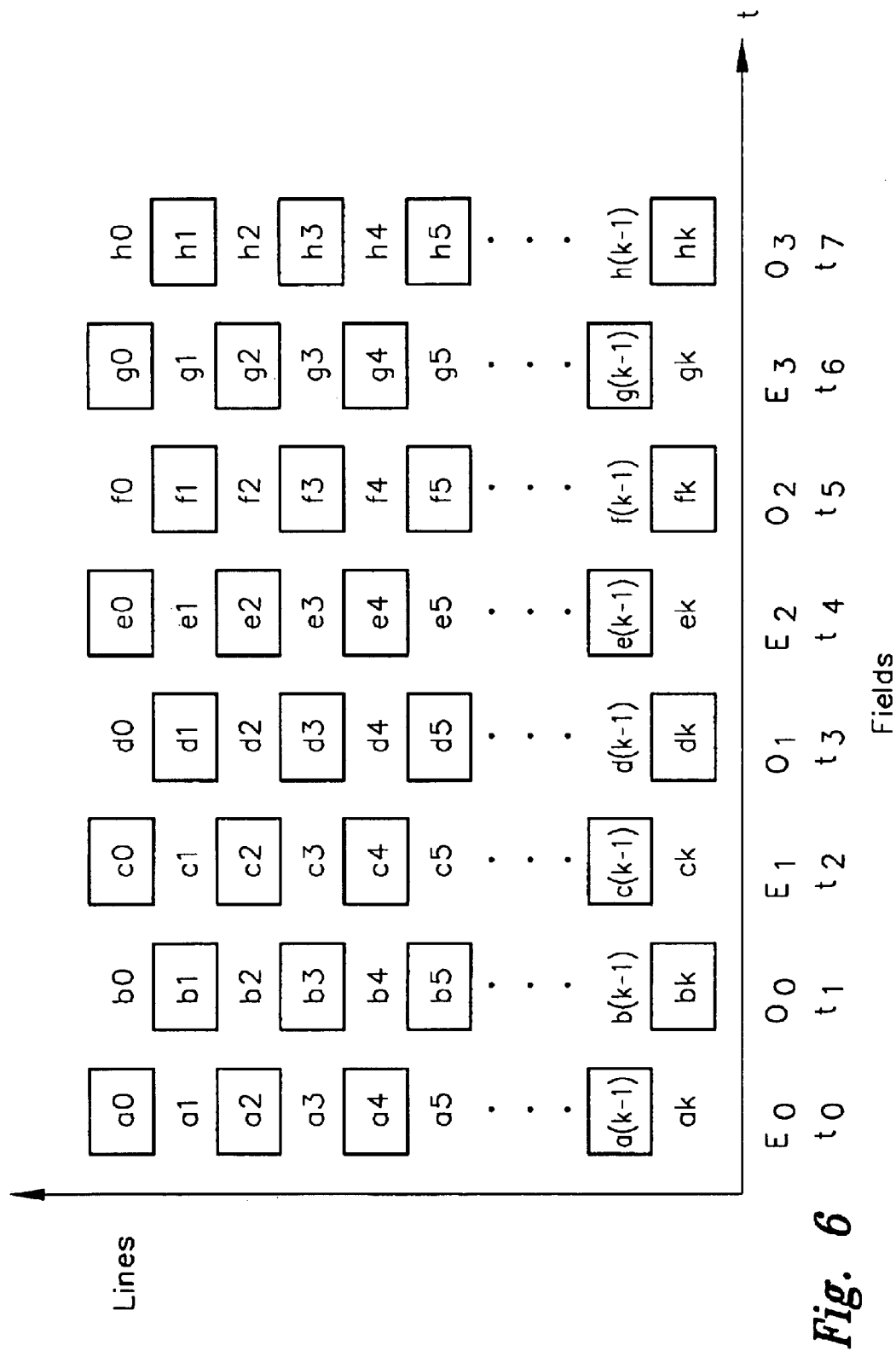
FIG. 6 is a timing diagram of a sequence of video fields according to an embodiment of the invention.

FIG. 6 is a timing diagram of a sequence of video fields that the field buffer 52 of FIG. 4 receives according to an embodiment of the invention. The sequence includes four even fields $E_0$–$E_3$, which alternate with four odd fields $O_0$–$O_3$ for a total of eight fields, i.e., four interlaced frames. Each field occurs at a relative time t within the sequence. For example, the odd field $O_3$ is the most recent field at time $t_7$, and the even field $E_0$ is the least recent field at time $t_0$. Furthermore, the original lines of each field are shown as closed blocks, and the filler lines of the complimentary filler fields are shown as open blocks. For example, the original field $E_0$ includes original even lines a0, a2, a4, . . . , a(k−1), and the odd filler field that the image processing circuit 50 of FIG. 4 will generate for $E_0$ includes filler odd lines a1, a3, a5, . . . , a(k). Likewise, the original field $O_0$ includes original odd lines b1, b3, b5, . . . , b(k), and the even filler field that the circuit 50 will generate for $O_0$ includes filler even lines b0, b2, b4, . . . , b(k−1). Although the filler lines are shown for clarity in explaining the filler-field generation process discussed below, one should understand that the field buffer 52 does not receive the filler lines. Furthermore, in this embodiment, a video frame has an even number of lines. Therefore, because a video field has half the lines of the video frame, each of the original video fields $E_0$–$E_3$ and $O_0$–$O_3$ also has an even number of lines. Thus, k−i is an even number and k is an odd number because the first line number is 0. As discussed below, the circuit 50 generates the values of the filler pixels from the original pixels in the complimentary field and in other fields of the same polarity. For example, in one embodiment, the circuit 50 generates the values of the filler pixels in the filler line a1 of $E_0$ from the values of the original pixels in the original lines a0 and a2 of $E_0$ and the original lines c0 and c2 of $E_1$.

Figure 7:
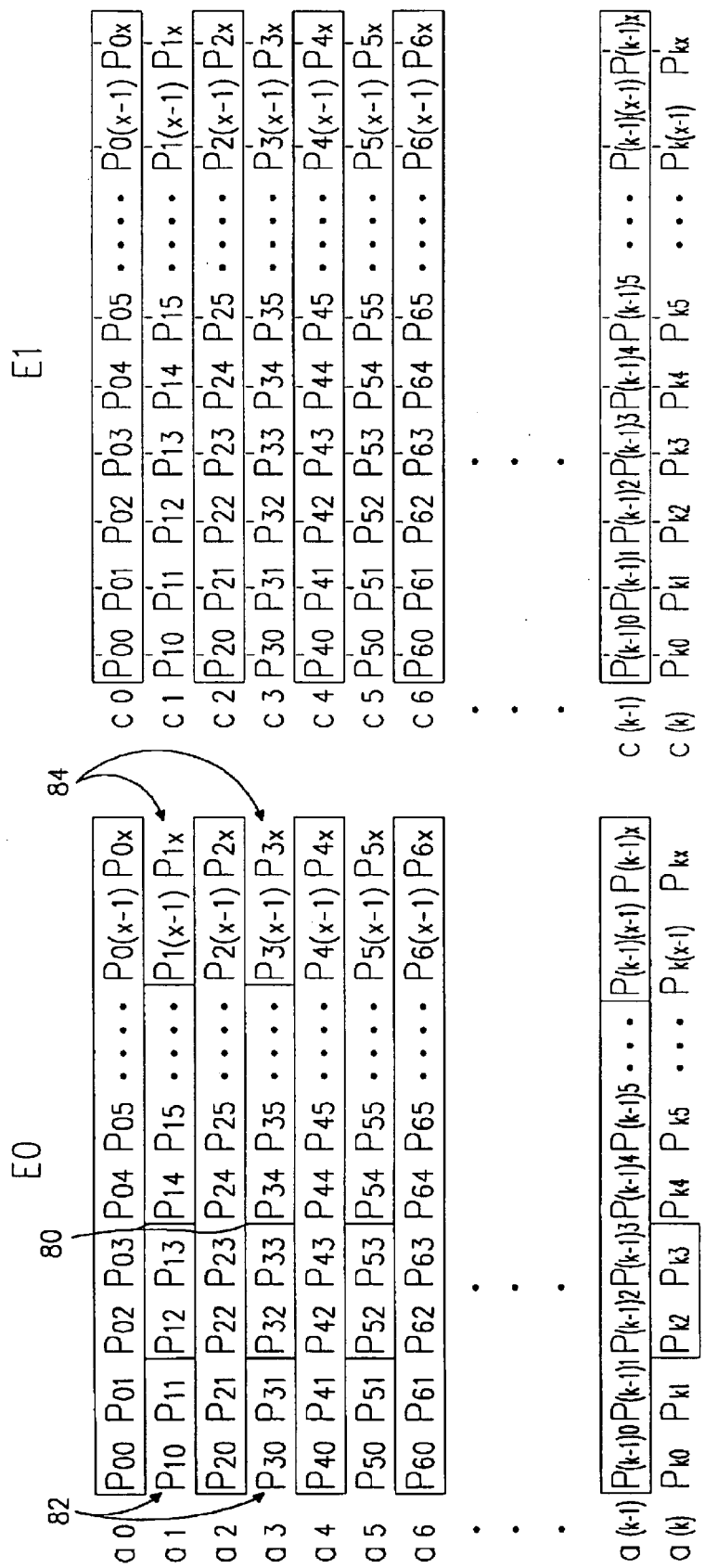
FIG. 7 is a diagram of two consecutive 4:2:0-formatted even video fields from FIG. 6 and their respective odd filler fields according to an embodiment of the invention.

Referring to FIG. 7, the generation of motion values for filler pixels in odd filler fields is discussed according to an embodiment of the invention. For example purposes, the generation of motion values is discussed in conjunction with the original even fields $E_0$ and $E_1$ being represented in a Y, $C_B$, and $C_R$ color space and having been compressed according to the MPEG 4:2:0 format, it being understood that the same principles apply to the other original even fields of the FIG. 6 sequence. The generation of motion values for filler pixels in even filler fields is discussed below in conjunction with FIG. 11.

Figure 1:
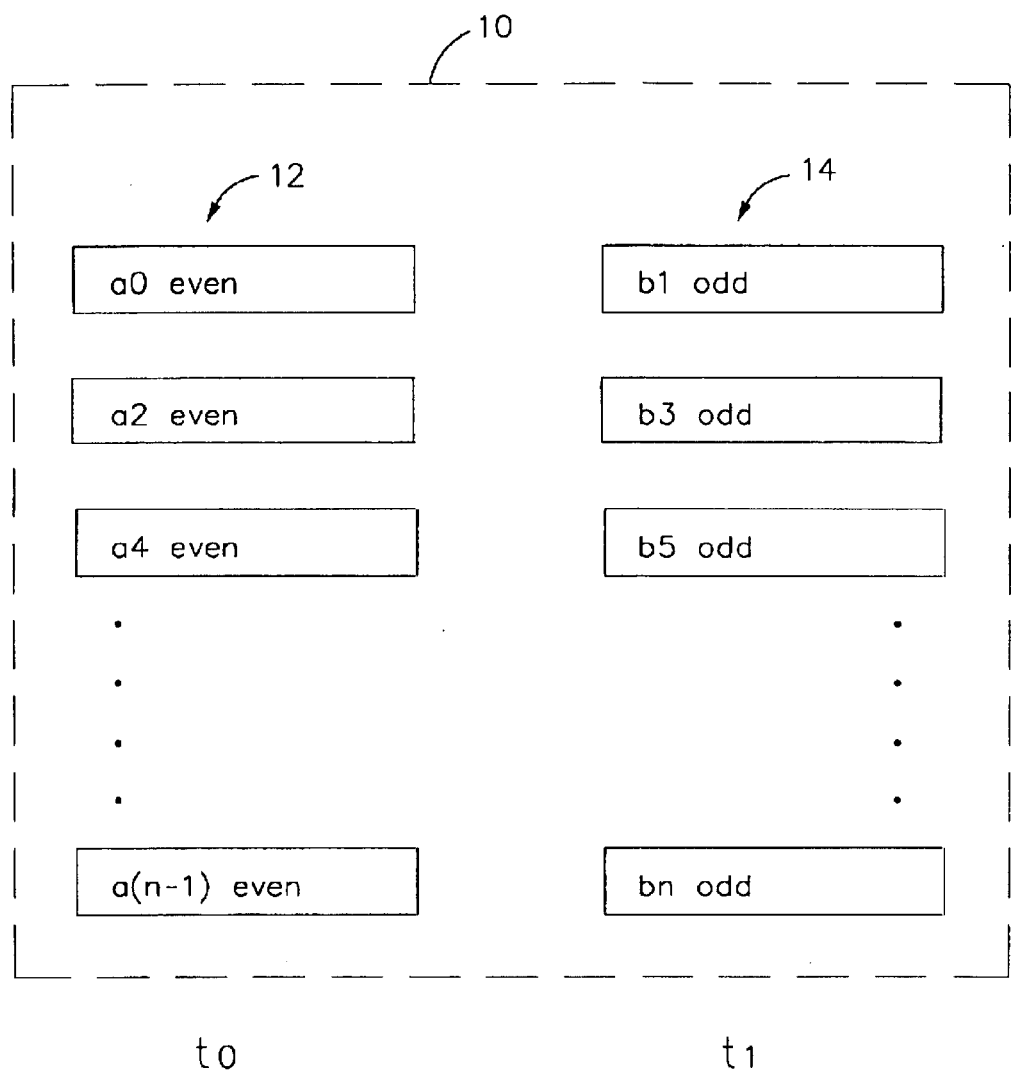
FIG. 1 is an interlaced video frame according to the prior art.
Figures 2A, 2B, 2C, 2D:
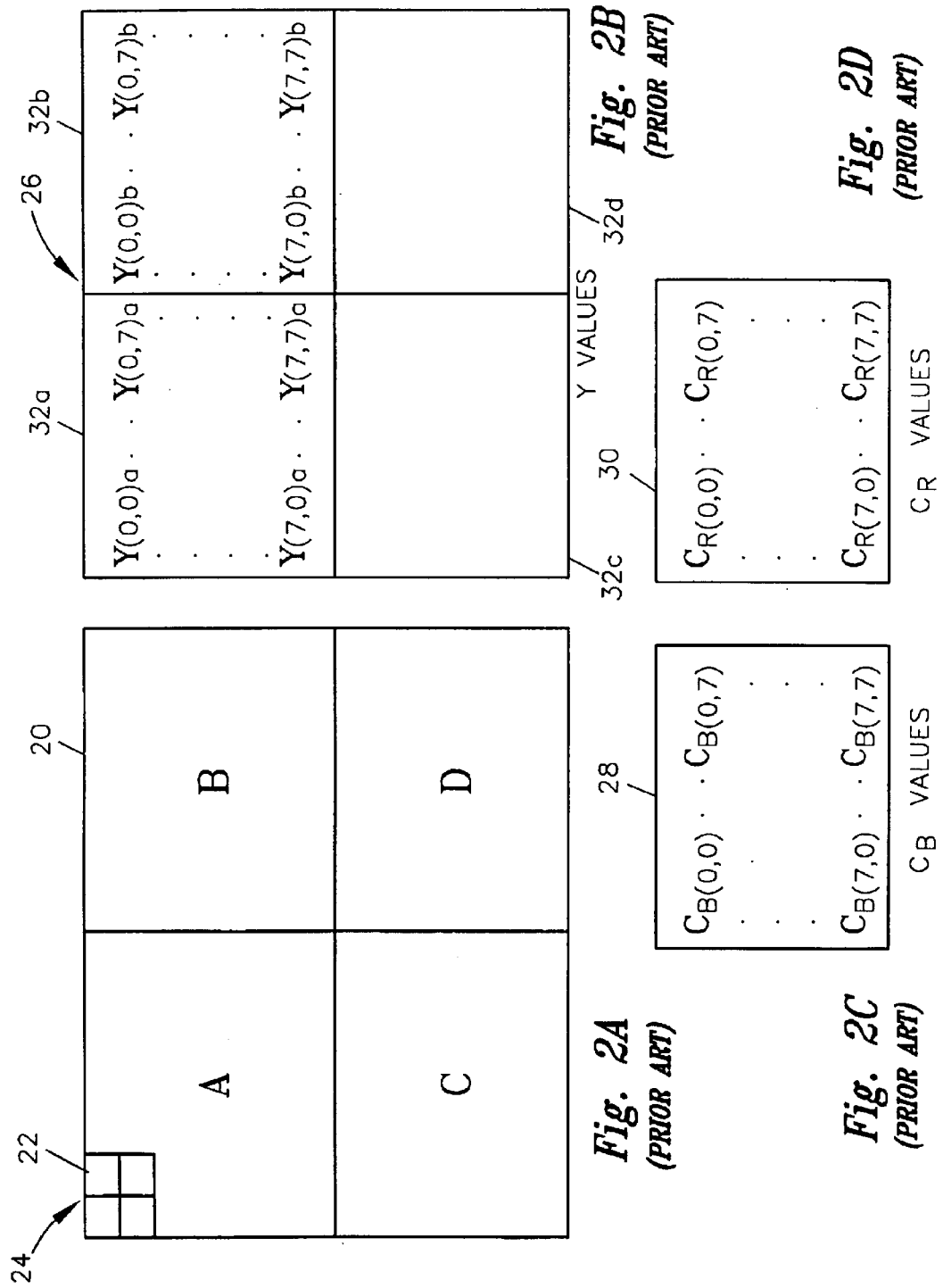
FIG. 2A is a diagram of a macro block of pixels that are arranged in 2×2 groups according to a conventional MPEG 4:2:0 format.
FIG. 2B is a diagram of a block of pre-compression luminance values that respectively correspond to the pixels in the macro block of FIG. 2A according to a conventional MPEG 4:2:0 format.
FIGS. 2C and 2D are diagrams of blocks of pre-compression chrominance values that respectively correspond to the pixel groups in the macro block of FIG. 2A according to a conventional MPEG 4:2:0 format.

FIG. 7 is a diagram of the original and filler pixels that compose the original and filler lines, respectively, of the even fields $E_0$ and $E_1$. The pixels of the original even field $E_0$ and its corresponding odd filler field are denoted as $P_{kx}$, and the pixels of $E_1$ and its corresponding odd filler field are denoted as $P'_{kx}$, where k denotes the line and x denotes the column. Like the original pixels, the filler pixels are arranged in 2×2 blocks of four pixels (see FIG. 2A). For example, a block 80 includes filler pixels $P_{12}$, $P_{13}$, $P_{32}$, and $P_{33}$, which compose the complimentary filler field for $E_0$.

Still referring to FIG. 7, the image processing circuit 50 of FIG. 4 generates a respective raw motion value RM for each interior block of filler pixels that compose the complimentary filler field for $E_0$. (The motion analysis of the exterior blocks, i.e., the blocks that include the first two and last two pixels of a line, are discussed below.) The circuit 50 calculates RM from the differences in the luminance and chrominance values of the original pixels that border the filler block in $E_0$ and the corresponding original pixels in $E_1$. For example, the luminance difference values for the filler-pixel block 80 are given by the following equation:

$$DY_{ij} = |Y_{ij} - Y'_{ij}|_{i=0,2;\ j=1,2,3,4} \quad 1)$$

Thus, in this embodiment, there are eight luminance difference values $DY$: $|Y_{01}-Y'_{01}|$, $|Y_{02}-Y'_{02}|$, $|Y_{03}-Y'_{03}|$, $|Y_{04}-Y'_{04}|$, $|Y_{21}-Y'_{21}|$, $|Y_{22}-Y'_{22}|$, $|Y_{23}-Y'_{23}|$, and $|Y_{24}-Y'_{24}|$. Here, $Y_{01}$ is the luminance value for the original pixel $P_{01}$, $Y'_{01}$ is the luminance value for $P'_{01}$, $Y_{02}$ is luminance value for the original pixel $P_{02}$, and so on. The $C_R$ difference value is given by the following equation:

$$DC_{R01} = |C_{R01} - C'_{R01}| \quad 2)$$

where $C_{R01}$ is the $C_R$ value for the block of original pixels in $E_0$ including $P_{02}$, $P_{03}$, $P_{22}$, and $P_{23}$, and $C'_{R01}$ is the $C_R$ value for the block of original pixels in $E_1$ including $P'_{02}$, $P'_{03}$, $P'_{22}$, and $P'_{23}$. Similarly, the $C_B$ difference value is given by the following equation:

$$DC_{B01} = |C_{B01} - C'_{B01}| \quad 3)$$

where the blocks of original pixels for $C_{B01}$ and $C'_{B01}$ are the same as the blocks for $C_{R01}$ and $C'_{R01}$, respectively.

Still referring to FIG. 7, the image processing circuit 50 of FIG. 5 calculates the raw motion value $RM_{01}$, for the block 80 as the maximum of the average luminance and chrominance differences according to the following equation:

$$RM_{01} = \mathrm{Max}\left[\frac{1}{8}\sum_{i_{even}=0}^{2}\sum_{j=0}^{4} DY_{ij},\ DC_{R01},\ DC_{B01}\right] \quad 4)$$

Figure 8:
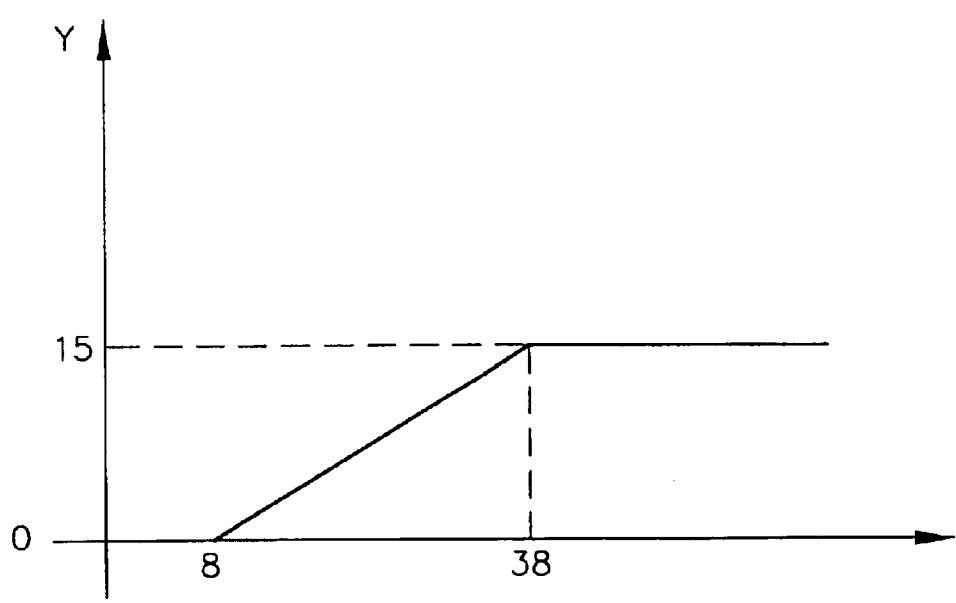
FIG. 8 is a plot of the transfer function of a raw-motion-value filter according to an embodiment of the invention.

Referring to FIG. 8, in one embodiment, the image processing circuit 50 of FIG. 4 filters the raw motion values RM to reduce the occurrence of false motion detection caused by noise and to limit the motion values to four bits, i.e., a maximum value of 15. FIG. 8 is a plot of the filtering algorithm according to an embodiment of the invention. Thus, the circuit 50 calculates the filtered motion values FM according to the following equation:

$$\begin{cases} RM \leq 8 & FM = 0 \\ 8 < RM < 38 & FM = \dfrac{RM - 8}{2} \\ RM \geq 38 & FM = 15 \end{cases} \quad 5)$$

According to equation (5), the circuit 50 considers a raw motion value RM that is less than or equal to 8 to be noise, not true motion, and thus generates a corresponding filtered motion value FM=0. Likewise, the circuit 50 limits the maximum FM by clipping to 15 all RM values that are greater than or equal to 38.

Referring back to FIG. 4, because the image processing circuit 50 of FIG. 5 derives the luminance difference values DY from groups of four original pixels in the same original line, the circuit 50 cannot use the above-described technique to generate raw motion values for the filler pixels at the beginnings and ends of filler lines. For example, the circuit 50 uses four pixels $P_{O1}$, $P_{O2}$, $P_{O3}$, and $P_{O4}$ in the same line to generate some of the DY values for the filler block 80. Therefore, $P_{O1}$ precedes the block 80 in a horizontal direction, and $P_{O4}$ proceeds the block 80 in the horizontal direction. But referring to the filler blocks 82 and 84, because no pixels precede the block 82 and no pixels proceed the block 84, equation (1) is invalid for these blocks. Thus, in one embodiment, the circuit 50 calculates no raw or filtered motion values for the filler blocks 82 and 84 and the other filler blocks that contain the first two or last two filler pixels of respective filler lines. Alternatively, the circuit 50 assigns predetermined filtered motion values to these blocks. For example, in one embodiment, the circuit 50 assigns these blocks a constant FM value or the same FM value as calculated for the adjacent block in the same filler line. For example, according to the latter approach, the circuit 50 sets the filtered motion value $FM_{00}$ for the block 82 equal to $FM_{01}$, which the circuit 50 calculates for the adjacent block 80 as described above.

FIG. 9 illustrates the content layout of a motion-value buffer 90 for storing filtered motion values FM for filler fields derived from MPEG 4:2:0 original fields according to an embodiment of the invention. Referring to FIG. 4, in one embodiment, the image processing circuit 50 dedicates a portion of the memory 58 as the buffer 90, although the buffer 90 may reside in another memory. The circuit 50 includes only one buffer 90, and updates the contents of this buffer for each filler field. A procedure for updating the buffer 90 is discussed below in conjunction with FIG. 16.

The storage locations FM of the buffer 90 respectively correspond to the filler-pixel blocks described in conjunction with FIG. 7. For example, the location $FM_{01}$ stores the filtered motion value $FM_{01}$, which corresponds to the block 80 of FIG. 7. Furthermore, if the image processing circuit 50 of FIG. 4 assigns motion values to the beginning-line and ending-line pixel blocks, then the buffer 90 also includes optional locations that are shown in dashed line. For example, the optional location $FM_{00}$ corresponds to the beginning-line block 82 of FIG. 7, and the optional location $FM_{O(x/2)}$ corresponds to the ending-line pixel block 84.

Referring to FIGS. 7 and 9, because the dimensions of the filler-pixel blocks such as the block 80 are 2×2 and because the image processing circuit 50 of FIG. 4 calculates one FM value per block, the horizontal dimension of the buffer 90 is either half or two pixels less than half the horizontal dimension of the original and filler fields. Specifically, if the motion-value buffer 90 includes the optional storage locations shown in dashed line, then the horizontal dimension of the buffer 90 is half the horizontal dimension of the original and filler fields. For example, if the original and filler fields have horizontal dimensions of x=720 pixels, then the buffer 90 is 720÷2=360 memory locations wide. Alternatively, if the motion-value buffer 90 does not include the optional storage locations shown in dashed line, then the horizontal dimension of the buffer 90 is half the horizontal dimension of the original and filler fields minus two pixels. For example, if the original and filler fields have horizontal dimensions of x=720 pixels, then the buffer 90 is (720÷2)−2=358 memory locations wide.

Similarly, the vertical dimension of the buffer 90 is one-half the vertical dimension of the original and filler fields, and thus one-fourth the vertical dimension of the resulting progressive frames generated by the image processing circuit 50 of FIG. 4. This is true whether or not the buffer 90 includes the optional storage locations. For example, if the original and filler fields each have vertical dimensions of k/2=240 lines—the corresponding progressive frames have k=2×240=480 lines—then the buffer 90 is k/4=240÷2—480÷4 with respect to the corresponding progressive frames—=120 memory locations high.

FIG. 10 illustrates the content layout of a motion-trace buffer 92 for storing motion-trace values MT for filler fields derived from MPEG 4:2:0 original fields according to an embodiment of the invention. As discussed below in conjunction with FIG. 16, each motion-trace value specifies the number of filler fields for which a respective FM value is valid. Referring to FIG. 4, in one embodiment, the image processing circuit 50 dedicates a portion of the memory 58 as the buffer 92, although the buffer 92 may reside in another memory. The circuit 50 includes only one buffer 92, and updates the contents of this buffer for each filler field. A procedure for updating the buffer 92 is discussed below in conjunction with FIG. 16.

The storage locations MT of the buffer 92 respectively correspond to the filler-pixel blocks described in conjunction with FIG. 7. For example, the location $MT_{01}$ stores the motion-trace value $MT_{01}$, which corresponds to the block 80 of FIG. 7, and thus which corresponds to the location $FM_{01}$ of the motion-value buffer 90 of FIG. 9. Furthermore, if the image processing circuit 50 of FIG. 4 assigns motion values, and thus motion-trace values, to the beginning-line and ending-line pixel blocks, then the buffer 92 also includes optional locations that are shown in dashed line. For example, the optional location $MT_{00}$ corresponds to the beginning-line block 82 of FIG. 7, and thus corresponds to the location $FM_{00}$ of the motion-value buffer 90. Similarly, the optional location $MT_{O(x/2)}$ corresponds to the ending-line pixel block 84 of FIG. 7, and thus corresponds to the location $FM_{O(x/2)}$ of the motion-value buffer 90.

Still referring to FIG. 10, the motion-trace buffer 92 has the same dimensions as the motion-value buffer 90 as discussed above in conjunction with FIG. 9. Furthermore, in one embodiment, each storage location MT is four bits wide.

Referring to FIGS. 9 and 10, the motion-value and motion-trace buffers 90 and 92 are significantly smaller than the motion memories of many prior image processing circuits. Furthermore, one can vary a motion-trace value within a predetermined range to vary the number of filler fields for which a respective FM value is valid without increasing the size of the buffer 92.

Referring to FIGS. 7, 9, and 10, as long as k+1 is divisible by four, then there are no partial (2×1) filler-pixel blocks at the bottom of the complimentary odd filler fields for the even fields E. For example, the last row of filler blocks include respective pixels from the filler lines a(k−2) and a(k), and there are no unpaired filler lines below this. Conversely, if k+1 is not divisible by four, then there is a row of partial filler blocks that include pixels from only one filler line a(k). In this situation, the image processing circuit 50 of FIG. 4 can calculate the raw and filtered motion values and the motion-trace values for these partial filler blocks in a number of ways. For example, the circuit 50 can set the raw and filtered motion values and the motion-trace value for a partial filler block equal to the raw and filtered motion values and motion-trace value, respectively, for the full filler block immediately above the partial filler block. For example, referring to FIGS. 7 and 9, if the filtered-motion-value location $FM_{(k,4)1}$ corresponds to a partial filler block in the filler field that compliments $E_0$, then the circuit 50 can set $FM_{(k/4)1} = FM_{((k/4)-1)1}$ and $MT_{(k/4)-1)1}$.

Figure 11:
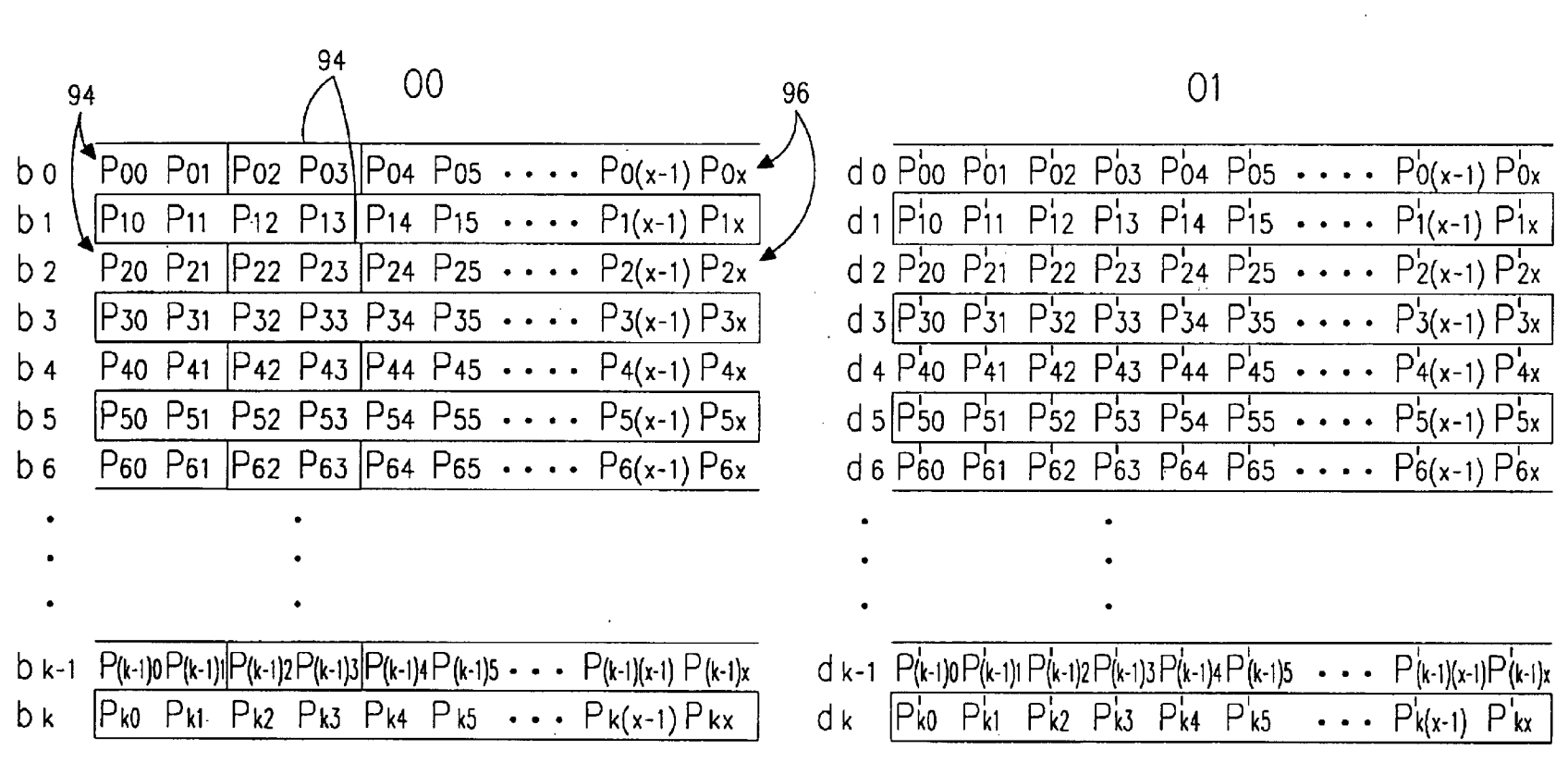

Referring to FIG. 11, the generation of motion values for filler pixels in odd filler fields is discussed according to an embodiment of the invention. For example purposes, the generation of motion values is discussed in conjunction with the original odd fields $O_0$ and $O_1$ being represented in a Y, $C_B$, and $C_R$ color space and having been compressed according to the MPEG 4:2:0 format, it being understood that the same principles apply to the other original odd fields of the FIG. 6 sequence. The generation of motion values for filler pixels in even filler fields is discussed above in conjunction with FIG. 7.

FIG. 11 is a diagram of the original and filler pixels that compose the original and filler lines, respectively, of the odd fields $O_0$ and $O_1$. The pixels of the original odd field $O_0$ and its corresponding even filler field are denoted as $P'_{kx}$, and the pixels of $O_1$ and its corresponding even filler field are denoted as $P'_{kx}$, where k denotes the line and x denotes the column. Like the original pixels, the filler pixels are arranged in 2×2 blocks of four pixels (see FIG. 2A). For example, a block 94 includes filler pixels $P_{02}$, $P_{03}$, $P_{22}$, and $P_{23}$, which-compose the complimentary filler field for $O_0$.

Still referring to FIG. 11, the calculation of the difference values DY, $DC_R$, and $DC_B$ and the raw and filtered motion values RM and FM for the even filler fields are similar to the respective DY, $DC_R$, $DC_B$, RM, and FM calculations for the odd filler fields as described above in conjunction with FIG. 7. For example, DY, $DC_R$, $DC_B$, and RM for the block 94 are given by the following equations:

$$DY_{ij} = |Y_{ij} - Y''_{ij}|_{i=1,3;j=1,2,3,4} \qquad 6)$$

$$DC_{ROI} = |C_{ROI} - C'_{ROI}| \qquad 7)$$

$$DC_{BOI} = |C_{BOI} - C'_{BOI}| \qquad 8)$$

$$RM_{01} = \text{Max}\left[\frac{1}{8}\sum_{i_{odd}=1}^{2}\sum_{j=0}^{4}DY_{ij}, DC_{ROI}, DC_{BOI}\right] \qquad 9)$$

$FM_{01}$ is given by equation (5).

Referring to FIGS. 7, 9, and 11 and equations (5) and (9), the location $FM_{01}$ of the motion-value buffer 90 corresponds to the block 80 of FIG. 7 and to the block 94 of FIG. 11. Therefore, the image processing circuit 50 of FIG. 4 stores only one $FM_{01}$ value—$FM_{01}$ for the block 80 or $FM_{01}$ for the block 94—in the location $FM_{01}$. The procedure for selecting which $FM_{01}$ to store is discussed below in conjunction with FIG. 16.

Furthermore, as discussed above in conjunction with FIG. 7, the image processing circuit 50 of FIG. 4 cannot use the above-described technique to generate raw motion values for the filler blocks such as blocks 96 and 98 that include filler pixels at the beginnings and ends of filler lines. Thus, in one embodiment, the circuit 50 calculates no raw or filtered motion values for the filler blocks 96 and 84 and the other filler blocks containing the first two or last two filler pixels of respective filler lines. Alternatively, the circuit 50 assigns predetermined filtered motion values to these blocks. For example, in one embodiment, the circuit 50 assigns these blocks a constant FM value or the same FM value as calculated for the adjacent block in the same filler line. For example, according to the latter approach, the circuit 50 sets the filtered motion value $FM_{00}$ for the block 96 equal to $FM_{01}$, which the circuit 50 calculates for the adjacent block 94 as described above.

Referring to FIGS. 9, 10, and 11, as discussed above in conjunction with FIG. 7, as long as k+1 is divisible by four, then there are no partial (2×1) filler-pixel blocks at the bottom of the complimentary even filler fields for the odd fields O. Conversely, if k+1 is not divisible by four, then there is a row of partial filler blocks that include pixels from only one odd filler line b(k−1). In this situation, the image processing circuit 50 of FIG. 5 can calculate the raw and filtered motion values and the motion-trace values for these partial filler blocks in a number of ways as discussed above in conjunction with the filler field of FIG. 7.

Figures 3A, 3B:
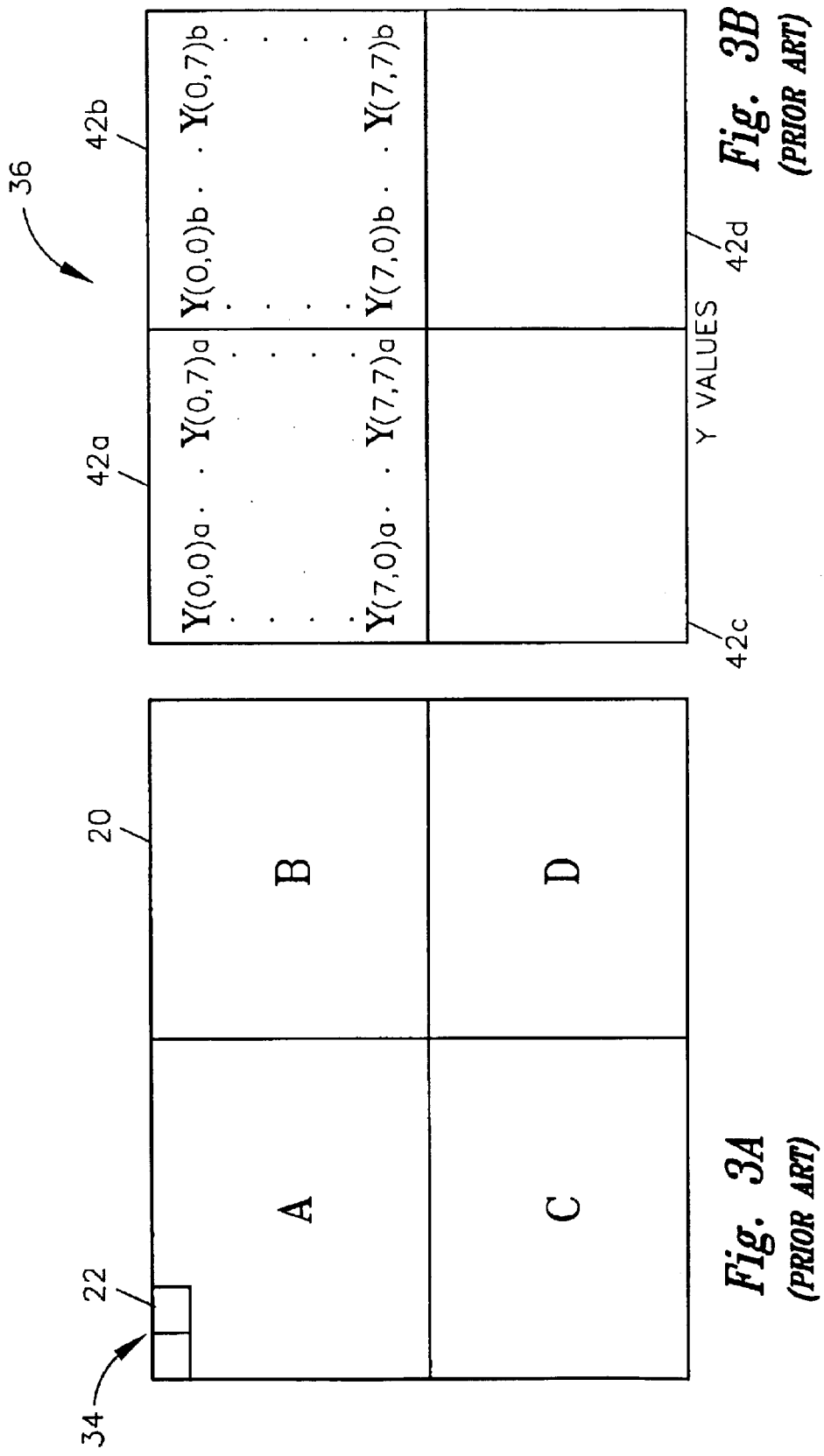
FIG. 3A is a diagram of a macro block of pixels that are arranged in 2×1 groups according to a conventional MPEG 4:2:2 format.
FIG. 3B is a diagram of a block of pre-compression luminance values that respectively correspond to the pixels in the macro block of FIG. 3A according to a conventional MPEG 4:2:2 format.
Figure 3C:
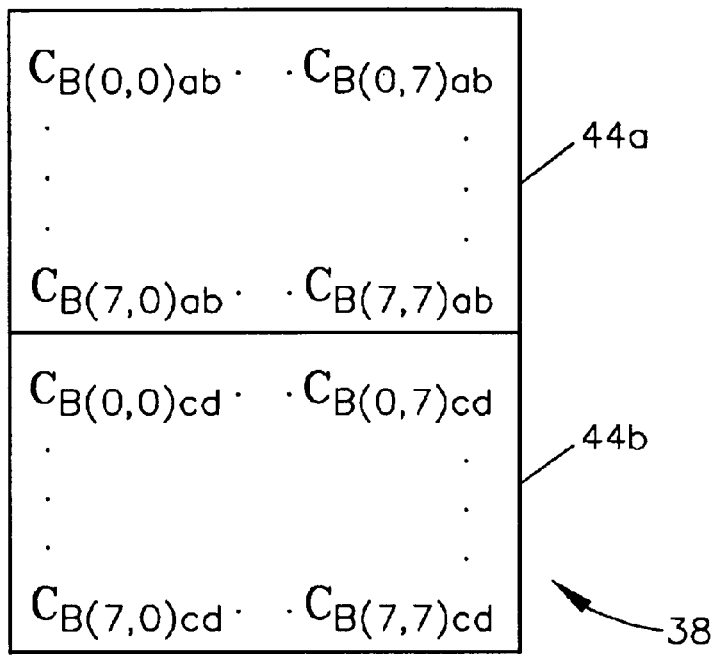
FIGS. 3C and 3D are diagrams of blocks of pre-compression chrominance values that respectively correspond to the pixel groups in the macro block of FIG. 3A according to a conventional MPEG 4:2:2 format.
Figure 3D:
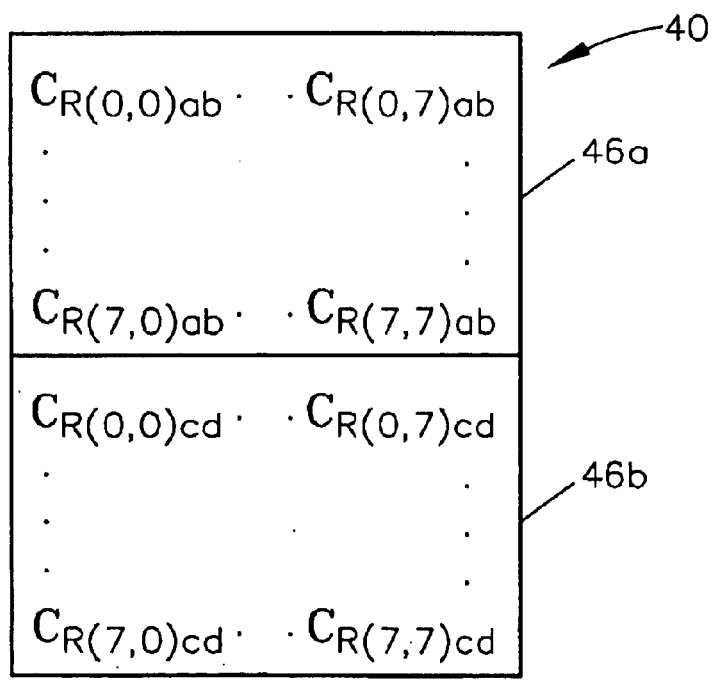
Figure 12:
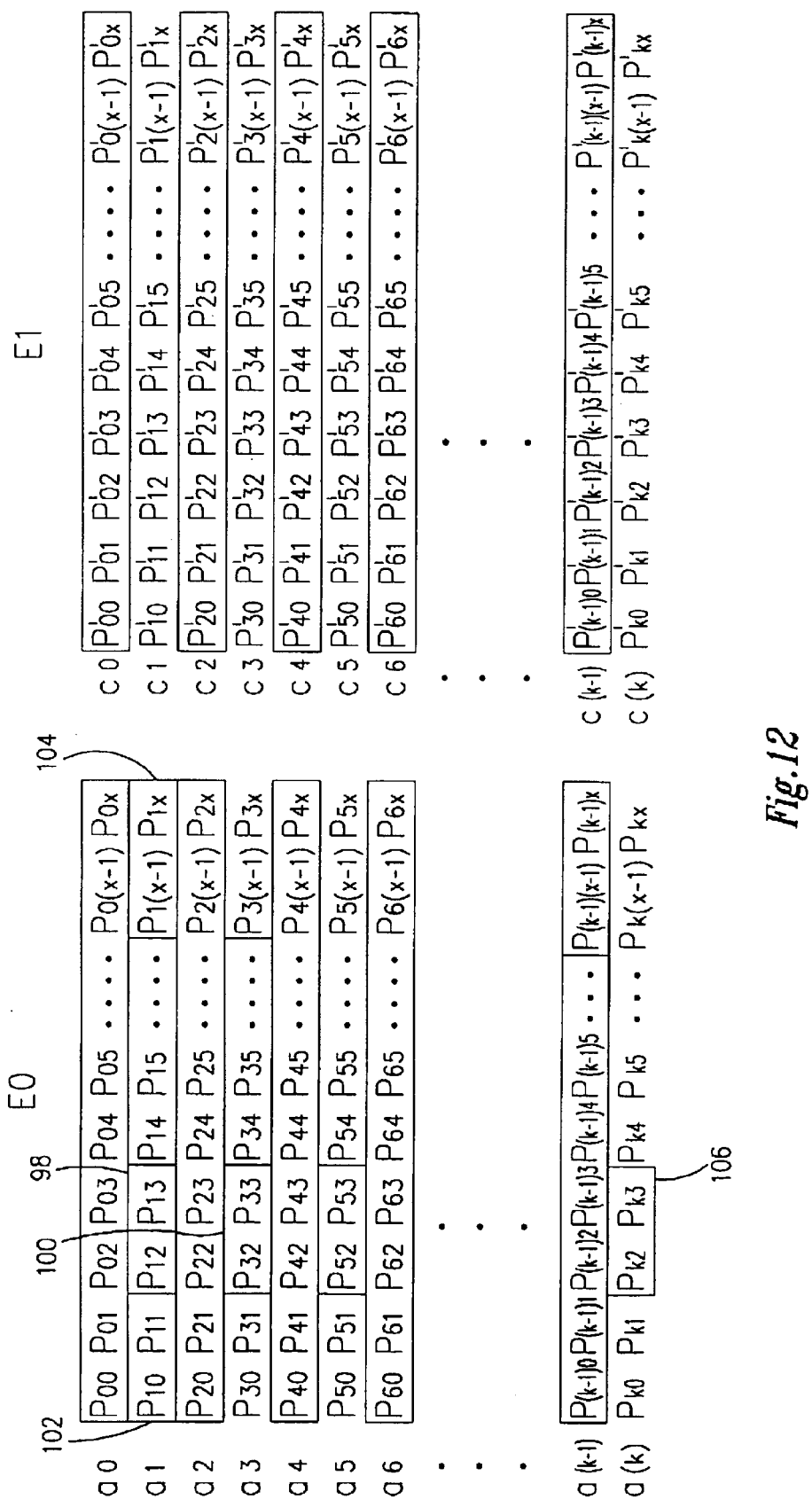
FIG. 12 is a diagram of two consecutive 4:2:2-formatted even video fields from FIG. 6 and their respective odd filler fields according to an embodiment of the invention.

Referring to FIG. 12, the generation of motion values for filler pixels in even filler fields is discussed according to another embodiment of the invention in which the original even fields of FIG. 6 are represented in a Y, $C_B$, and $C_R$ color space and have been compressed and decompressed according to the MPEG 4:2:2 format. Like the original pixels, the filler pixels are arranged in 2×1 blocks of two pixels (see FIG. 3A). For example, a block 98 includes filler pixels $P_{12}$ and $P_{13}$, and a block 100 includes filler pixels $P_{32}$ and $P_{33}$. Thus, the major difference between FIGS. 7 and 12 is that in FIG. 12, the filler-pixel blocks contain two pixels instead of four pixels. Therefore, DY, $DC_R$, $DC_B$, and RM for the block 98 are given by the following equations:

$$DY_{ij} = |Y_{ij} - Y'_{ij}|_{i=0,2;j=1,2,3,4} \qquad 10)$$

$$DC_{Ri1} = C_{Ri1} - C'_{Ri1}|_{i=0,2} \qquad 11)$$

$$DC_{Bi1} = C_{Bi1} - C'_{Bi1}|_{i=0,2} \qquad 12)$$

$$RM_{01} = \qquad 13)$$

$$\text{Max}\left[\frac{1}{8}\sum_{i_{even}=0}^{2}\sum_{j=1}^{4}DY_{ij}, \frac{1}{2}\sum_{i_{even}=0}^{2}DC_{R_i 1}, \frac{1}{2}\sum_{i_{even}=0}^{2}DC_{B_i 1}\right]$$

$FM_{01}$ is given by equation (5). Furthermore, the calculation of DY is the same as for the 4:2:0 format, and thus equation (10) is the same as equation (5). Furthermore, because the 4:2:2 format calls for one $C_R$ and one $C_B$ value for each 2×1 block of original pixels, the calculation of $DC_R$ includes taking the difference between $C_{R01}$, which corresponds to pixels $P_{02}$ and $P_{03}$ of $E_0$, and $C'_{R01}$, which corresponds to $P'_{02}$ and $P'_{03}$ of $E_1$, and taking the difference between $C_{R11}$, which corresponds to pixels $P_{22}$ and $P_{23}$ of $E_0$, and $C'_{R11}$, which corresponds to pixels $P'_{22}$ and $P'_{23}$ of $E_1$. A similar analysis applies to $DC_B$.

Still referring to FIG. 12, the image processor circuit 50 of FIG. 5 calculates difference and raw motion values for the 2×1 block 100 according to the following equations:

$$DY_{ij} = |Y_{ij} - Y'_{ij}|_{i=2,4; \ j=1,2,3,4} \qquad (14)$$

$$DC_{Ri1} = |C_{Ri1} - C'_{Ri1}|_{i=2,4} \qquad (15)$$

$$DC_{Bi1} = |C_{Bi1} - C'_{Bi1}|_{i=2,4} \qquad (16)$$

$$RM_{11} = \qquad (17)$$

$$\text{Max}\left[\frac{1}{8}\sum_{i_{even}=2}^{4}\sum_{j=1}^{4}DY_{ij}, \ \frac{1}{2}\sum_{i_{even}=2}^{4}DC_{R_i1}, \ \frac{1}{2}\sum_{i_{even}=2}^{4}DC_{B_i1}\right]$$

Furthermore, for the same reasons discussed above in conjunction with FIG. 7, the image processing circuit 50 of FIG. 4 cannot use the above-described technique to generate raw or filtered motion values for the filler-pixel blocks 102 and 104 and other filler blocks containing filler pixels at the beginnings and ends of filler lines. Thus, the circuit 50 generates filtered motion values for these filler blocks as discussed above in conjunction with FIG. 7.

In addition, if k+1 is divisible by two, the last filler line a(k) of the filler field that compliments $E_0$ is not "sandwiched" between two original lines of $E_0$. Therefore, the circuit 50 calculates DY, $DC_R$, $DC_B$, and RM for a last-line filler block such as the block 106 using original pixels in only the last lines a(k–1) and c(k–1), respectively, of the original fields $E_0$ and $E_1$. For example, the circuit 50 calculates the difference and raw motion values for the pixel block 106 according to the following equations:

$$DY_{(k-1)j} = |Y_{(k-1)j} - Y'_{(k-1)j}|_{j=1,2,3,4} \qquad (18)$$

$$DC_{R(k-1)1} = |C_{R(k-1)1} - C'_{R(k-1)1}| \qquad (19)$$

$$DC_{B(k-1)1} = |C_{B(k-1)1} - C'_{B(k-1)1}| \qquad (20)$$

$$RM_{(k-1)1} = \text{Max}\left[\frac{1}{4}\sum_{j=1}^{4}DY_{(k-1)j}, \ DC_{R(k-1)1}, \ DC_{B(k-1)1}\right] \qquad (21)$$

Thus, for example DY for the block 106 is calculated using the luminance values for the pixels $P_{(k-1)1}$, $P_{(k-1)2}$, $P_{(k-1)3}$, and $P_{(k-1)4}$ from $E_0$ and $P'_{(k-1)0}$, $P'_{(k-1)1}$, $P'_{(k-1)2}$, $P'_{(k-1)3}$, and $P'_{(k-1)4}$ from $E_1$. Likewise, $DC_R$ and $DC_B$ are calculated from the $C_R$ and $C_B$ values, respectively, for the 2×1 blocks of original pixels that include $P_{(k-1)2}$ and $P_{(k-1)3}$ from $E_0$ and $P'_{(k-1)2}$ and $P'_{(k-1)3}$ from $E_1$. The circuit 50 uses equation (5) to calculate the filtered motion values.

FIG. 13 illustrates the content layout of a motion-value buffer 108 for storing filtered motion values FM for filler fields derived from MPEG 4:2:2 original fields according to an embodiment of the invention. Referring to FIG. 4, in one embodiment, the image processing circuit 50 dedicates a portion of the memory 58 as the buffer 108, although the buffer 108 may reside in another memory. The circuit 50 includes only one buffer 108, and updates the contents of this buffer for each filler field. A procedure for updating the buffer 108 is discussed below in conjunction with FIG. 16.

Referring to FIGS. 12 and 13, because the dimensions of the filler-pixel blocks such as the block 98 are 2×1 and because the image processing circuit 50 of FIG. 4 calculates one FM value per block, the horizontal dimension of the buffer 108 is either half or two pixels less than half the horizontal dimension of the original and filler fields. Specifically, if the motion-value buffer 108 includes the optional storage locations shown in dashed line, then the horizontal dimension of the buffer 108 is half the horizontal dimension of the original and filler fields. For example, if the original and filler fields have horizontal dimensions of x=720 pixels, then the buffer 108 is X/2=720÷2=360 memory locations wide. Alternatively, if the motion-value buffer 108 does not include the optional storage locations shown in dashed line, then the horizontal dimension of the buffer 108 is half the horizontal dimension of the original and filler fields minus two pixels. For example, if the original and filler fields have horizontal dimensions of x=720 pixels, then the buffer 90 is (x/2)–2=(720÷2)–2=358 memory locations wide.

Similarly, the vertical dimension of the buffer 108 is the same as the vertical dimension of the original and filler fields, and thus one-half the vertical dimension k of the resulting progressive frames generated by the image processing circuit 50 of FIG. 4. This is true whether or not the buffer 108 includes the optional storage locations. For example, if the original and filler fields each have vertical dimensions of k/2=240 lines—the corresponding progressive frames have k=2×240=480 lines—then the buffer 108 is k/2=240–480+2 with respect to the corresponding progressive frames—=240 memory locations high.

Thus, the motion-value buffer 108 has the same horizontal dimension and twice the vertical dimension as the motion-value buffer 90 of FIG. 9.

FIG. 14 illustrates the content layout of a motion-trace buffer 110, which is similar to the buffer 92 of FIG. 10 except that it stores motion-trace values MT for filler fields derived from MPEG 4:2:2 original fields according to an embodiment of the invention. The storage locations MT of the buffer 110 respectively correspond to the filler-pixel blocks described in conjunction with FIG. 12. For example, the location $MT_{01}$ stores the motion-trace value $MT_{01}$, which corresponds to the block 98 of FIG. 12, and thus which corresponds to the location $FM_{01}$ of the motion-value buffer 108 of FIG. 13. Furthermore, if the image processing circuit 50 of FIG. 4 assigns motion values, and thus motion-trace values, to the beginning-line and ending-line pixel blocks, then the buffer 108 also includes optional locations that are shown in dashed line. For example, the optional location $MT_{00}$ corresponds to the beginning-line block 102 of FIG. 12, and thus corresponds to the location $FM_{00}$ of the motion-value buffer 108.

Still referring to FIG. 14, the motion-trace buffer 100 has the same dimensions as the motion-value buffer 108 as discussed above in conjunction with FIG. 13.

Figure 15:
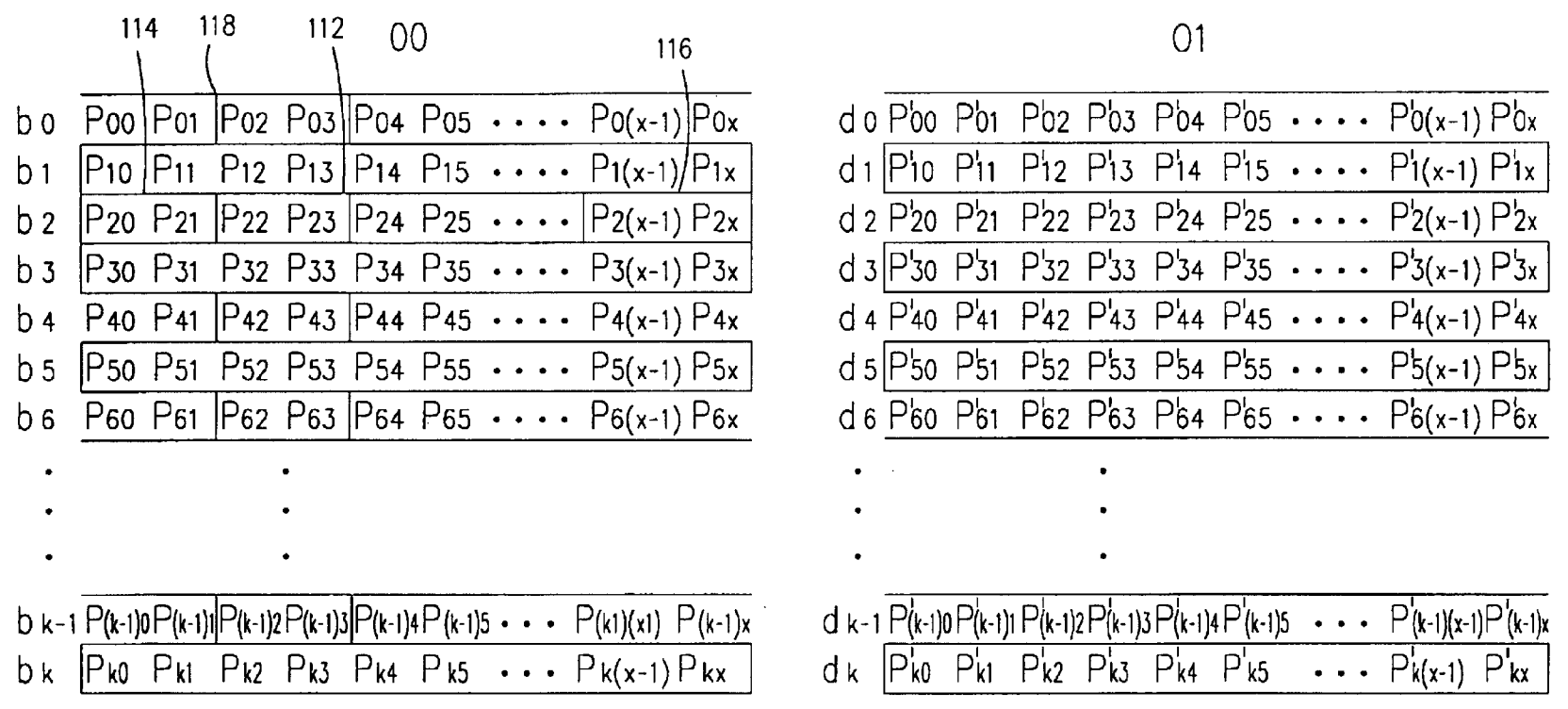

Referring to FIG. 15, the generation of motion values for filler pixels in odd filler fields is discussed for the original odd fields of FIG. 6 being represented in a Y, $C_B$, and $C_R$ color space and having been compressed and decompressed according to the MPEG 4:2:2 format. The calculation of the difference values DY, $DC_R$, and $DC_B$ and the raw and filtered motion values RM and FM for the even filler fields are similar to the respective DY, $DC_R$, $DC_B$, RM, and FM calculations for the even filler fields as described above in conjunction with FIG. 12. For example, DY, $DC_R$, $DC_B$, and RM for the block 112 are given by the following equations:

$$DY_{ij} = |Y_{ij} - Y'_{ij}|_{i=1,3; j=1,2,3,4} \qquad (22)$$

$$DC_{Ri1} = |C_{Ri1} - C'_{Ri1}|_{i=1,3} \qquad (23)$$

$$DC_{Bi1} = |C_{Bi1} - C'_{Ri1}|_{i=1,3} \qquad (24)$$

$$RM_{11} = \text{Max}\left[\frac{1}{8}\sum_{i_{odd}=1}^{3}\sum_{j=0}^{4}DY_{ij}, \ \frac{1}{2}\sum_{i_{odd}=1}^{3}DC_{R_i1}, \ \frac{1}{2}\sum_{i_{odd}=1}^{3}DC_{B_i1}\right] \qquad (25)$$

$FM_{01}$ is given by equation (5). Furthermore, for the same reasons discussed above in conjunction with FIG. 7, the image processing circuit 50 of FIG. 4 cannot use the above-described technique to generate raw or filtered motion values for the filler-pixel blocks 114 and 116 and other filler blocks containing filler pixels at the beginnings and ends of filler lines. Thus, the circuit 50 generates filtered motion values for these filler blocks as discussed above in conjunction with FIG. 7.

In addition, because the first filler line b0 of the filler field that compliments $O_0$ is not "sandwiched" between two original lines of $O_0$, the circuit 50 calculates DY, $DC_R$, $DC_B$, and RM for a first-line filler block such as the block 118 using original pixels in only the second lines b1 and d1, respectively, of the original fields $O_0$ and $O_1$. For example, the circuit 50 calculates the difference and raw motion values for the pixel block 118 according to the following equations:

$$DY_{1j} = |Y_{1j} - Y'_{1j}|_{j=1,2,3,4} \qquad (26)$$

$$DC_{R01} = |C_{R01} - C'_{R01}| \qquad (27)$$

$$DC_{B01} = |C_{B01} - C'_{B01}| \qquad (28)$$

$$RM_{01} = \text{Max}\left[\frac{1}{4}\sum_{j=1}^{4} DY_{1j}, DC_{R01}, DC_{B01}\right] \qquad (29)$$

$FM_{01}$ is given by equation (5). Similarly, if k+1 is not divisible by two, the last filler line bk of the filler field is not "sandwiched" between two original lines of $O_0$. Therefore, the circuit 50 calculates DY, $DC_R$, $DC_B$, and RM for a last-line filler block using original pixels in only the lines b(k−1) and d(k−1), respectively.

Referring to FIGS. 12, 13, and 15, the location $FM_{01}$ of the motion-value buffer 108 corresponds to the block 98 of FIG. 12 and to the block 108 of FIG. 15. Therefore, the image processing circuit 50 of FIG. 4 stores only one $FM_{01}$ value—$FM_{01}$ for the block 98 or $FM_{01}$ for the block 108—in the location $FM_{01}$. The procedure for selecting which $FM_{01}$ to store is discussed below in conjunction with FIG. 16.

Figure 16:
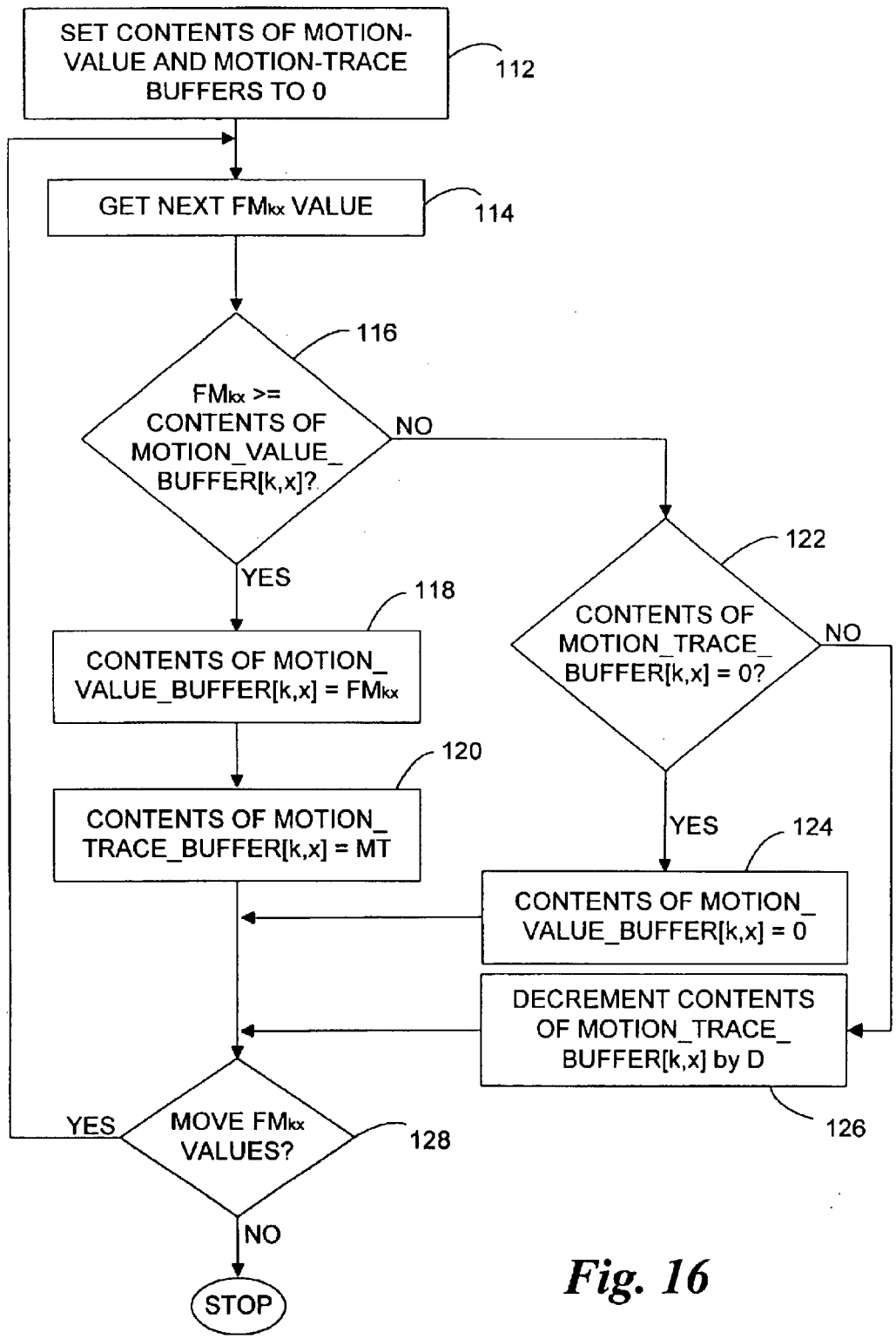
FIG. 16 is a flow diagram of a technique for loading and updating the contents of the motion-value buffers of FIGS. 9 and 12 and the motion-trace buffers of FIGS. 10 and 13 according to an embodiment of the invention.

FIG. 16 is a flow diagram of the technique that the image processing circuit 50 of FIG. 4 implements to initialize and update the motion-value buffer 90 and motion-trace buffer 92 of FIGS. 9 and 10 (4:2:0 format) or the buffers 108 and 100 of FIGS. 13 and 14 (4:2:2 format) according to an embodiment of the invention. For clarity, this technique is discussed in conjunction with the buffers 90 and 92, it being understood that the technique is similar for the buffers 108 and 110.

Referring to FIG. 4 and block 112 of FIG. 16, the processor 56 loads 0 into all storage locations of the buffers 90 and 92.

Referring to block 114, the processor 56 then retrieves the next filtered motion value $FM_{kx}$, which it is previously calculated and stored in the memory 58.

Referring to blocks 116 and 118, if $FM_{kx}$ is greater than or equal to the current contents of the location k, x of the motion-value buffer 90, then the processor 56 overwrites the location k, x with $FM_{kx}$. Next, referring to block 120, the processor 56 loads an initial MT value into the k, x location of the motion-trace buffer 92. In one embodiment, the initial MT value equals 5.

Conversely, referring to blocks 116 and 122, if $FM_{kx}$ is less than the current contents of the k, x location of the motion-value buffer 90, then the processor 56 analyzes the contents of the k, x, location of the trace buffer 92. If the contents equals 0, then, referring to block 124, the processor 56 loads 0 into the k, x location of the motion-value buffer 90 to indicate that there is no motion associated with the respective filler-pixel block of the current filler field. Conversely, referring to block 126, if the contents of the k, x location of the trace buffer 92 does not equal 0, then the processor 56 decrements the contents by a predetermined value D. In one embodiment, D=1.

Referring to block 128, the processor 56 processes the next $FM_{kx}$ value in a similar manner.

Therefore, by varying the values of D and the initial MT, one can vary the maximum number of filler fields that a motion value will influence. For example, referring to FIGS. 6, 7, 9, 10, 11, and 16, suppose that the initial MT=5, D=1, $FM_{01}$=15 for the filler-pixel block 80 of the filler line a1 for $E_0$, and $FM_{01}$<15 for the corresponding filler-pixel blocks of the filler lines b0–b2, c1–c3, d0–d2, e1–e3, and f0–f2 for $O_0$, $E_1$, $O_1$, $E_2$, and $O_2$, respectively. Thus, according to the flow diagram of FIG. 16, for the block 80, the processor 56 loads $FM_{01}$=15 into the $FM_{01}$ location of the motion-value buffer 90 and loads 5 into the $MT_{01}$ location of the trace buffer 92. Next, because $FM_{01}$<15 for the filler-pixel block 94 (FIG. 11), the processor 56 leaves the previous $FM_{01}$=15 in the $FM_{01}$ location of the buffer 90 and decrements the contents of the $MT_{01}$ location of the buffer 92 to 4. The processor 56 processes $FM_{01}$<15 for the filler-pixel blocks (not shown) for c1–c3, d0–d2, e1–e3, and f0–f2 in a similar manner. After processing the filler-pixel block of f0–f2, however, the location $MT_{01}$ of the trace buffer 92 equals 0. Thus, as discussed below, even if the processor 56 detects no subsequent motion, the motion detected between $E_0$ and $E_1$ influences the values of the filler pixels in the filler fields complimentary to six consecutive original fields: $E_0$, $O_0$, $E_1$, $O_1$, $E_2$, and $O_2$. Thus, unlike many of the prior image processing circuits, the image processing circuit 50 allows detected motion to influence the filler-pixel values in more than four filler fields. Furthermore, one can vary the initial MT value or D to vary the number of motion-affected filler fields without increasing the sizes the buffers 90 and 92.

Figure 17:
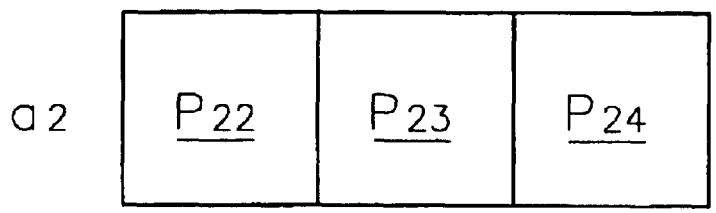
FIG. 17 is a diagram of the original pixels used to calculate direction vectors and spatially interpolated pixel values for a filler pixel according to an embodiment of the invention.
Figure 17:
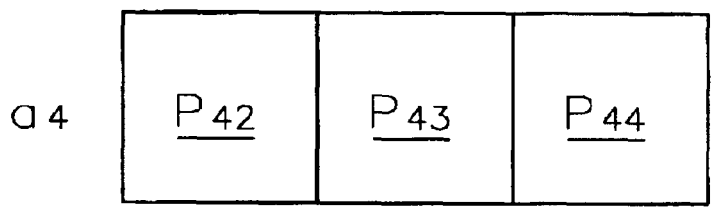

FIG. 17 is a diagram of the original pixels that the image processing circuit 50 of FIG. 4 uses to calculate direction values and to spatially interpolate a pixel value for a filler pixel according to an embodiment of the invention. For example purposes, the filler pixel is $P_{33}$ of the filler line a3 of FIG. 7, it being understood that the following discussion applies to other filler pixels except the first and last pixels of each filler line. Calculating values for these filler pixels is discussed below. As discussed below in conjunction with FIGS. 18A–18E, the circuit 50 calculates the direction values and spatially interpolates the pixel value for $P_{33}$ from the three original pixels $P_{22}$, $P_{23}$, and $P_{24}$ above $P_{33}$ and three pixels $P_{42}$, $P_{43}$, and $P_{44}$ below $P_{33}$.

Referring to FIGS. 18A–18E, in one embodiment of the invention, the image processing circuit 50 recognizes three edge directions and two thin-line directions with respect to the pixel diagram of FIG. 17. In determining the direction values, the circuit 50 uses only the luminance values Y of the original pixels in the pixel diagram.

Figure 18A:
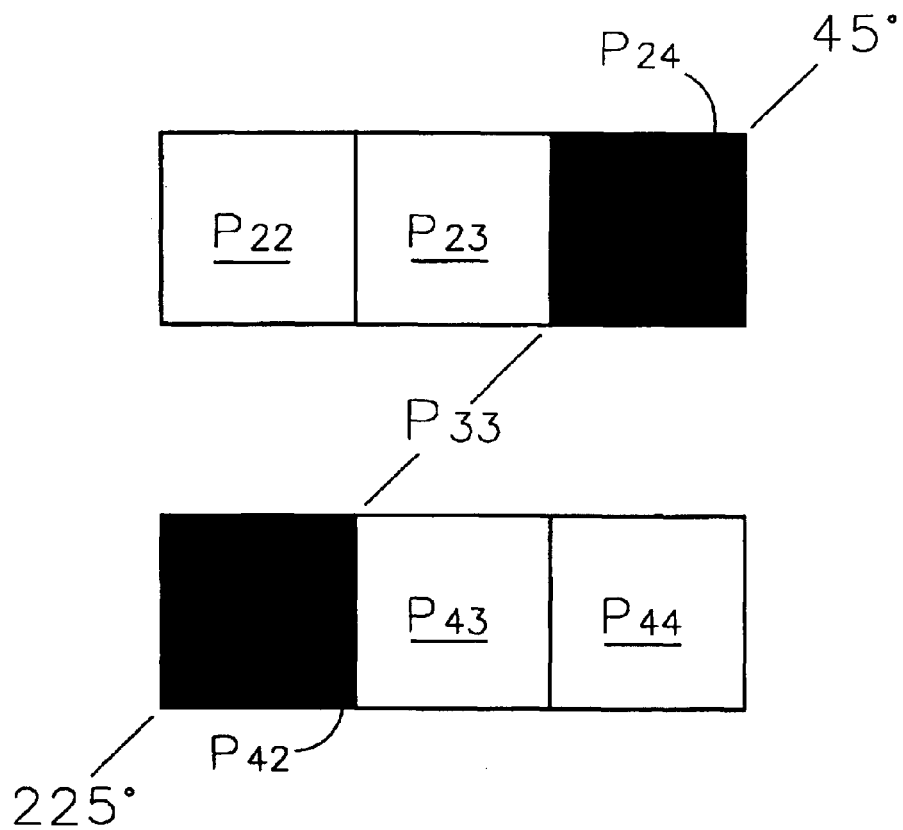

Referring to FIG. 18A, the circuit 50 recognizes a 45°–225° edge if the original pixels $P_{24}$ and $P_{42}$ have similar Y values. For example, if the normal to the edge points toward the lower right of the pixel group, then the pixels $P_{22}$ and $P_{23}$ have Y values similar to the Y values of $P_{42}$ and $P_{24}$. Conversely, if the normal to the edge points toward the upper left of the pixel group, then the pixels $P_{43}$ and $P_{44}$ have Y values similar to the Y values of $P_{24}$ and $P_{42}$.

Figure 18B:
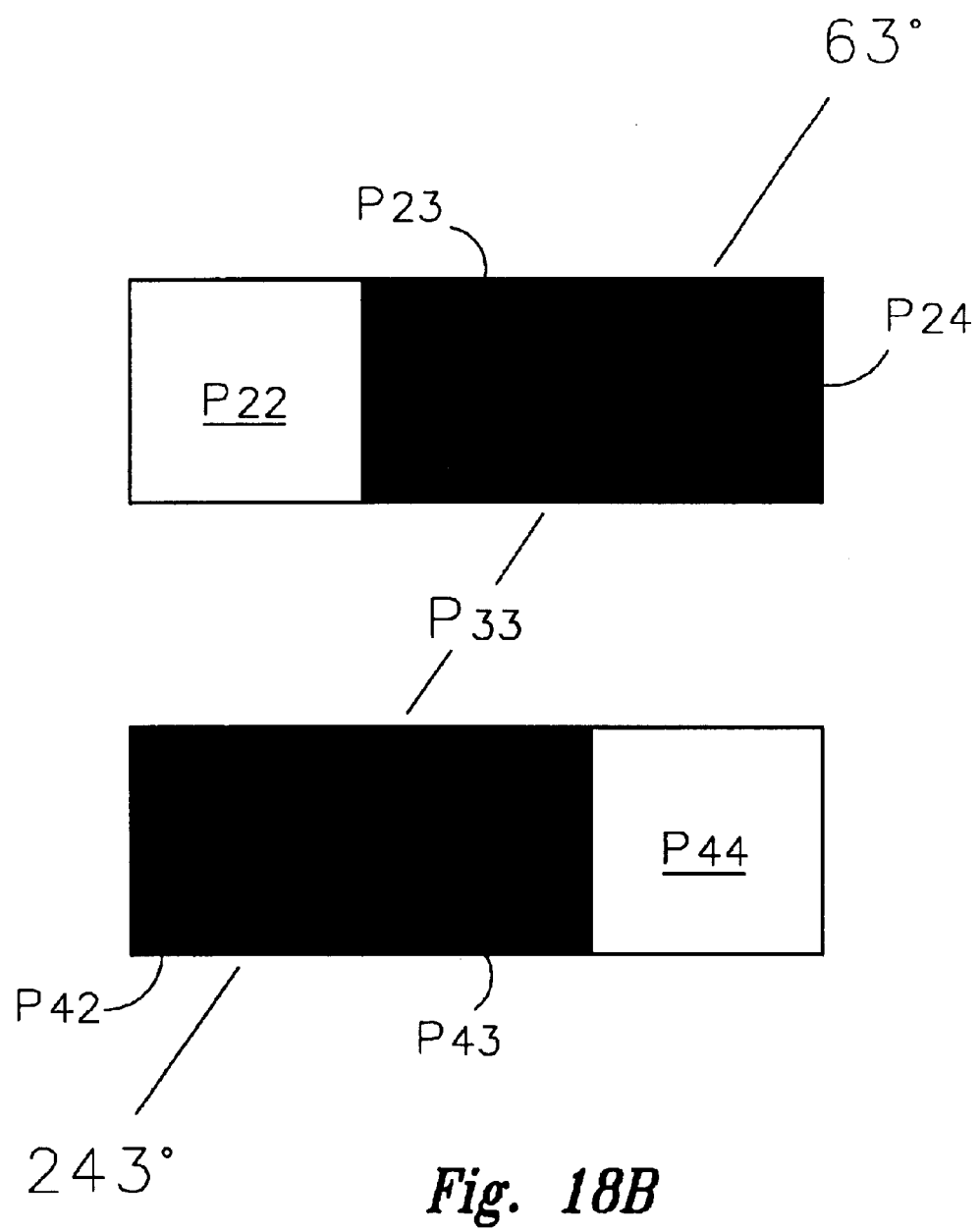
Figure 18C:
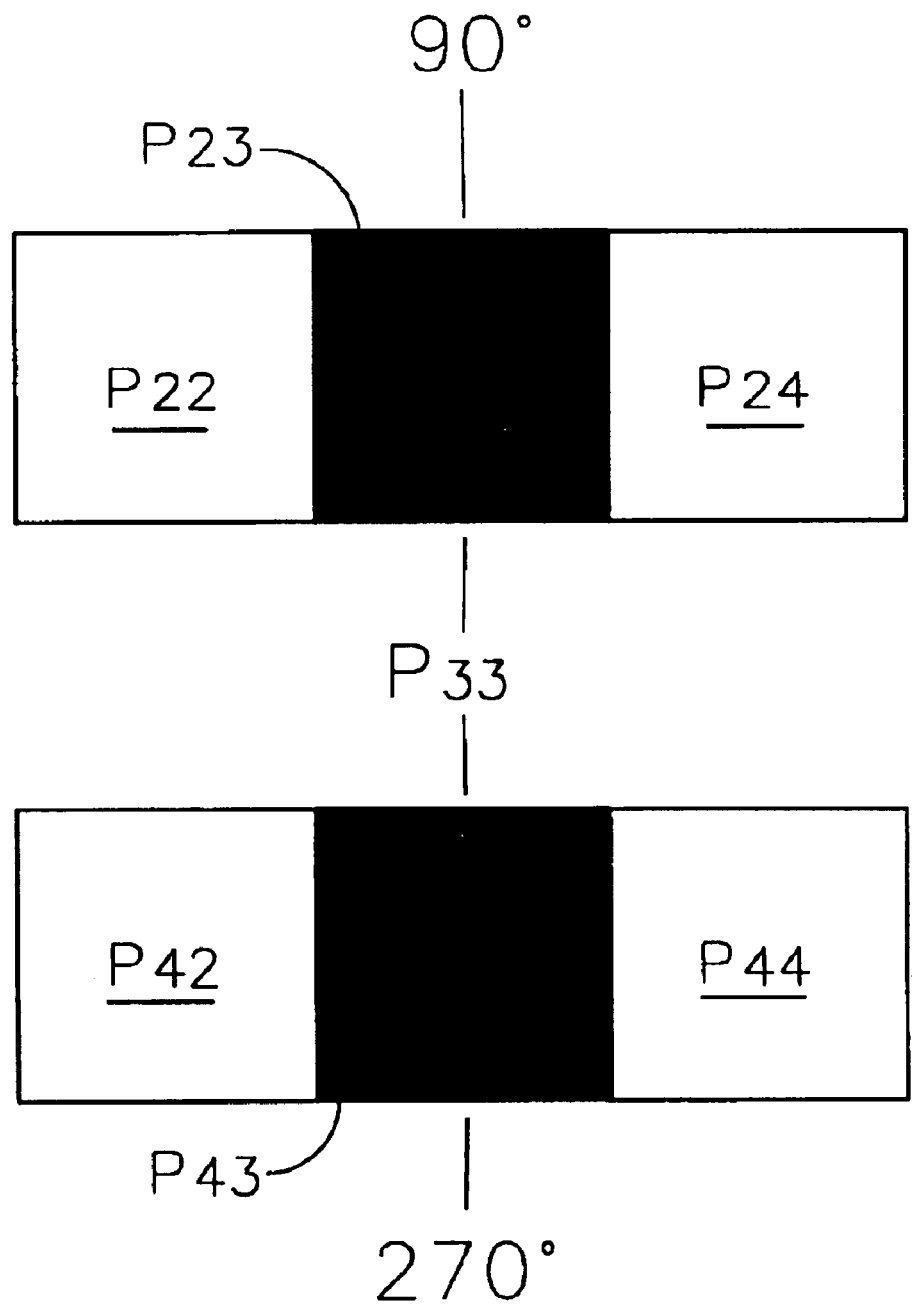

Referring to FIG. 18B, the circuit 50 recognizes a thin line that extends through the pixels $P_{23}$, $P_{24}$, $P_{42}$, and $P_{43}$ at approximately 63°–243°. This thin line is characterized by $P_{22}$ and $P_{44}$ having Y values that are significantly different than the Y values of $P_{23}$, $P_{24}$, $P_{42}$, and $P_{43}$. Referring to FIG. 18C, the circuit 50 recognizes a 90°–270° edge if the original pixels $P_{23}$ and $P_{43}$ have similar Y values. For example, if the normal to the edge points toward the right of the pixel group, then the pixels $P_{22}$ and $P_{42}$ have Y values similar to the Y values of $P_{23}$ and $P_{43}$. Conversely, if the normal to the edge points toward the left of the pixel group, then the pixels $P_{24}$ and $P_{44}$ have Y values similar to the Y values of $P_{23}$ and $P_{43}$. The circuit 50 also recognizes a 90°–270° edge if all of the pixels $P_{22}$, $P_{23}$, $P_{24}$, $P_{42}$, $P_{43}$, and $P_{44}$ have similar Y values.

Figure 18D:
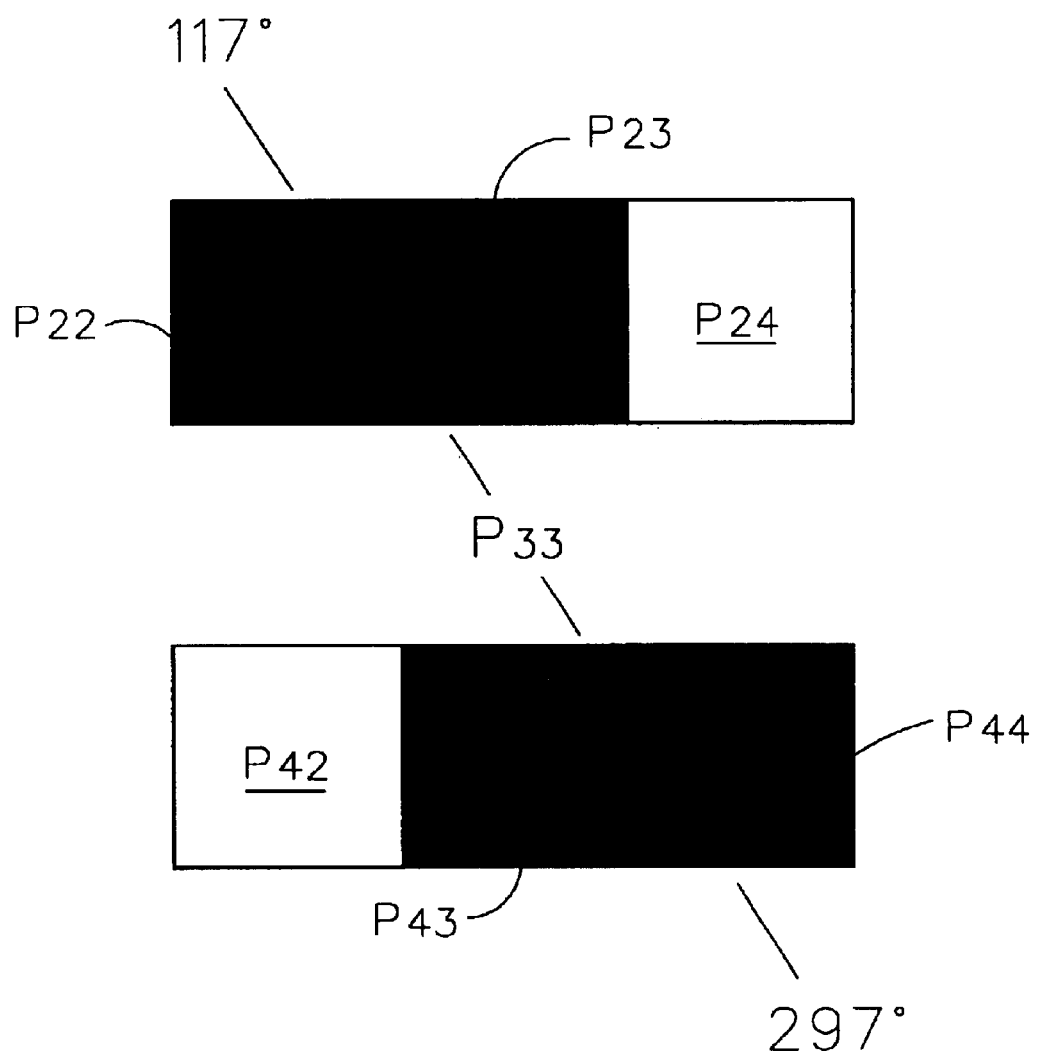

Referring to FIG. 18D, the circuit 50 recognizes a thin line that extends through the pixels $P_{22}$, $P_{23}$, $P_{43}$, and P44 at approximately 117°–297°. This thin line is characterized by $P_{24}$ and $P_{42}$ having Y values that are significantly different than the Y values of $P_{22}$, P23, $P_{43}$, and $P_{44}$.

Figure 18E:
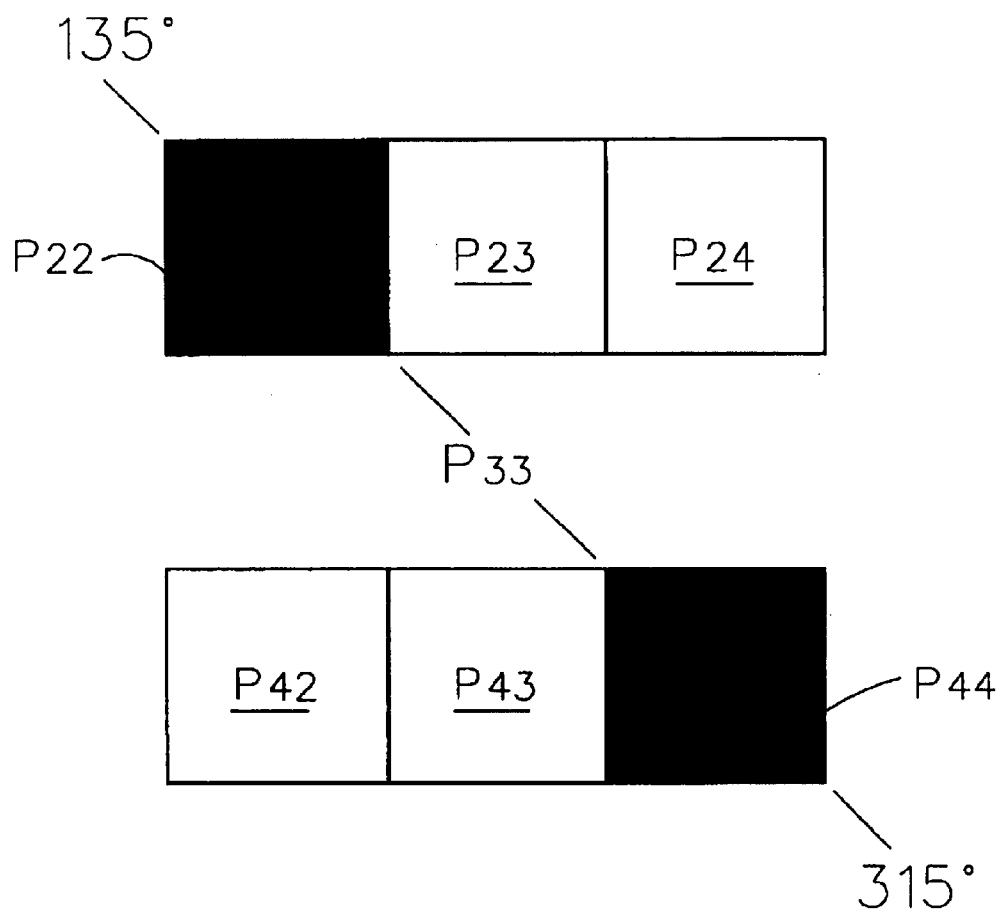

Referring to FIG. 18E, the circuit 50 recognizes a 135°–315° edge if the original pixels $P_{22}$ and $P_{44}$ have similar Y values. For example, if the normal to the edge points toward the lower left of the pixel group, then the pixels $P_{23}$ and $P_{24}$ have Y values similar to the Y values of $P_{22}$ and $P_{44}$. Conversely, if the normal to the edge points toward the upper right of the pixel group, then the pixels $P_{42}$ and $P_{43}$ have Y values similar to the Y values of $P_{22}$ and $P_{44}$.

The direction values DV are calculated according to column 2 of Table I.

TABLE I

| Directions | Pixel difference along directions | If minimum of pixel differences is below $T_{edge}$ threshold, estimate missing pixel value $P_s$ as: |
|---|---|---|
| 45°–225° (FIG. 18A) | $DV_{45-225} = |P_{24} - P_{42}| + \text{offset}$ | $P_{s33} = (P24 + P42)/2$ |
| 63°–243° (FIG. 18B) | $DV_{63-243} = (|P_{24} - P_{43}| + |P_{23} - P_{42}|)/2 + P_{23} + P_{43})/4$ | $P_{s33} = (P_{24} + P_{42} + P_{23} + P_{43})/4$ |
| 90°–270° (FIG. 18C) | $DV_{90-270} = |P_{23} - P_{43}|$ | $P_{s33} = (P_{23} + P_{43})/2$ |
| 117°–297° (FIG. 18D) | $DV_{117-297} = (|P_{23} - P_{44}| + |P_{22} - P_{43}|)/2 + P_{23} + P_{43})/4$ | $P_{s3} = (P_{22} + P_{44} + P_{23} + P_{43})/4$ |
| 135°–315° (FIG. 18E) | $DV_{135-315} = |P_{22} - P_{44}| + \text{offset}$ | $P_s = (P_{22} + P_{44})/2$ |
| No dominant edge direction if min. of above values $>T_{edge}$ | | Minimum DV $> T_{edge}$ so estimate $P_s$ as: $P_s = (P_{23} + P_{43})/2$ |

The circuit 50 calculates all the DV values according to column 2 of Table I, identifies the minimum DV value, and compares the minimum DV to a threshold $T_{edge}$. If the minimum DV is greater than $T_{edge}$, then processor 56 identifies by default a 90°–270° edge (FIG. 18C), and thus spatially interpolates Y, $C_R$, and $C_B$ values (collectively represented as $P_s$ in Table I) for $P_{33}$ equal to the average of the respective Y, $C_R$, and $C_B$ values of $P_{23}$ and $P_{43}$ as shown in the last row of column 3 of Table I. Conversely, if the minimum DV is less than or equal to $T_{edge}$, then the processor 56 calculates $P_s$ according to the equation corresponding to the minimum DV. For example, if $DV_{45-225}$ is the minimum, then the processor 56 calculates $P_s$ equal to the average of the values of $P_{24}$ and $P_{42}$. If $DV_{63-243}$ is the minimum value, then the processor 56 calculates $P_s$ equal to the average of the values of $P_{23}$, $P_{24}$, $P_{42}$, and $P_{43}$. If $DV_{90-270}$ is the minimum value, then the processor 56 calculates $P_s$ equal to the average of the values of $P_{23}$ and $P_{43}$. If $DV_{117-297}$ is the minimum value, then the processor 56 calculates $P_s$ equal to the average of the values of $P_{22}$, $P_{23}$, $P_{43}$, and $P_{44}$. And if $DV_{135-315}$ is the minimum value, then the processor 56 calculates $P_s$ equal to the average of the values of $P_{22}$ and $P_{44}$.

$T_{edge}$ is an empirically determined constant. In one embodiment, it is in the range of approximately 40–50.

The inventor has determined that the 63°–243° and 117°–297° thin lines have a tendency to be misinterpolated as 45°–225° and 135°–315° edges. Therefore, the circuit 50 adds an offset to $DV_{135-315}$ and $DV_{45-225}$ to effectively offset this misinterpolation by favoring the detection of thin lines. In one embodiment, the processor 56 calculates the offset according to the following equation:

$$\text{offset} = \begin{cases} 10 \sim 20 & \text{when} |P_{22} - P_{24}| > t_{line} \\ & \text{and } |P_{42} - P_{44}| > t_{line} \\ 0 & \text{Otherwise} \end{cases} \quad 30)$$

where $t_{line}$ is a threshold empirically determined to be approximately 30 in one embodiment of the invention.

Referring to FIGS. 7, 11, and 17, the processor 56 also temporally interpolates Y, $C_R$, and $C_B$ (collectively $P_t$) for each filler pixel from the corresponding original pixels in an adjacent original field having the same polarity as the filler field. For example, the processor 56 calculates $P_t$ for the filler pixel $P_{33}$ in the filler line a3 of $E_0$ (FIG. 7) equal to the luminance and chromanance values of the original pixel $P_{33}$ in the original line b3 of $O_0$ (FIG. 11).

Next, the processor 56 calculates the final values $P_f$ of the filler pixels according to the following equations:

$$\alpha = \max(FM_{(i-1)j}, FM_{ij}, FM_{(i+1)j}) \quad 31)$$

$$P_f = \frac{1}{15}(\alpha P_s + (15 - \alpha) P_t) \quad 32)$$

Specifically, the processor 56 calculates $P_f$ equal to the sum of α-weighted $P_s$ and (1−α) weighted $P_f$. α equals the maximum of the FM value of the filler pixel for which $P_f$ is being calculated, and the FM values of the filler-pixel blocks above and below the filler pixel. For example, referring to FIGS. 7 and 9, α for the filler pixel $P_{33}$ is the maximum of $FM_{01}$ and $FM_{11}$ (there is no filler pixel block above the block 80, and thus no FM location of the buffer 90 above $FM_{01}$) Taking the maximum of the three closest FM values in a vertical direction ensures that the spatially interpolated value $P_s$ is given the greatest weight where there is detected motion. Furthermore, as stated above in conjunction with FIG. 8, the maximum value of FM, and thus the maximum value of α, is 15. Therefore, the right side of equation (32) is divided by 15 for normalization.

Referring to equation (32), if there is significant motion such that α is relatively large, then $P_f$ is weighted heavily toward the spatially interpolated value $P_s$. Conversely, if there is little motion such that α is relatively small, then $P_f$ is weighted heavily toward the temporally interpolated value $P_t$.

Referring to FIG. 7, the generation of values for filler pixels at the beginnings and ends of filler pixel lines is discussed. For example purposes, the filler pixel $P_{10}$ of $E_0$ is discussed, it being understood that the following discussion applies to $P_{11}$ and other filler pixels at the beginning and ending of filler lines.

If the image processing circuit 50 assigns a predetermined value $FM_{00}$ to $P_{10}$ a and the other beginning- and end-of-line filler pixels as described above, then the processor 56 calculates $P_s$, $P_t$, and $P_f$ for $P_{10}$ as discussed above.

Conversely, if the processing circuit 50 does not assign a predetermined value $FM_{00}$ to $P_{10}$ and the other beginning- and end-of-line filler pixels as described above, then the processor 56 calculates $P_f$ a manner other than that described above. For example, the processor 56 may exclusively spatially interpolate $P_f$ for $P_{10}$ equal to the average of the respective Y, $C_R$, and $C_B$ values of the vertically adjacent original pixels $P_{00}$ and $P_{20}$. Or, the processor 56 may exclusively temporally interpolate $P_f$ for $P_{10}$ equal to the Y, $C_R$, and $C_B$ values of the corresponding original pixel $P_{10}$ in the adjacent original odd field $O_0$.

From the foregoing it will be appreciated that, although specific embodiments of the invention have been described herein for purposes of illustration, various modifications may be made without deviating from the spirit and scope of the invention.

What is claimed:

1. An image processing circuit, comprising:
a processor operable to,
   receive a value of a first original pixel of an original first video image and a value of an original pixel of an original second video image,
   determine a direction of an edge that includes the original pixel of the original first video image,
   generate an initial first pixel-value component from the value of the original pixel of the original first video image by executing an algorithm that corresponds to the direction of the edge,
   generate a second pixel-value component from the value of the original pixel of the original second video image,
   generate a value of a filler pixel from the first and second pixel-value components, and
   combine the filler pixel and the original first video image to generate a resulting video image.

2. The image processing circuit of claim 1 wherein the original second video image follows the original first video image in a sequence of video images.

3. The image processing circuit of claim 1 wherein:
   the original first video image comprises an original field; and
   the processor is operable to generate the resulting video image by,
      generating a filler field that includes the filler pixel and that is complimentary to the original field, and
      merging the original and filler fields.

4. The image processing circuit of claim 1 wherein:
the original first video image comprises a first original field that includes the original pixel of the original first video image;
   the original second video image comprises a second original field that includes the original pixel of the original second video image; and
   the processor is operable to generate the resulting video image by,
      generating a filler field that includes the filler pixel and that is complimentary to the first and second original fields, and
      combining the filler field and the first original field.

5. The image processing circuit of claim 1 wherein the processor is operable to:
   generate the first pixel-value component equal to the value of the original pixel of the original first video image; and
   generate the second pixel-value component equal to the value of the original pixel of the original second video image.

6. The image processing circuit of claim 1 wherein the processor is further operable to:
   weight the first and second pixel-value components; and
   generate the value of the filler pixel from the weighted first and second pixel-value components.

7. The image processing circuit of claim 1 wherein the processor is further operable to:
   generate a motion value from the values of the original pixels of the original first and second video images;
   generate from the motion value first and second weighting factors;
   generate a weighted first pixel-value component by combining the first weighting factor and the first pixel-value component;
   generate a weighted second pixel-value component by combining the second weighting factor and the second pixel-value component; and
   generate the value of the filler pixel from the weighted first and second pixel-value components.

8. An image processing circuit, comprising:
a processor operable to,
   receive a value of an original pixel of a first original video image and a value of an original pixel of a second original video image that follows the first original video image,
   generate a first motion value for a first filler video image from the values of the original pixels of the first and second original video images, and
   cause the first motion value to indicate motion for a first predetermined number of filler video images following the first filler video image if the first motion value indicates motion with respect to the first filler video image.

9. The image processing circuit of claim 8 wherein the processor is operable to generate the motion value equal to a difference between the values of the original pixels of the first and second original video images.

10. The image processing circuit of claim 8 wherein the predetermined number equals five.

11. The image processing circuit of claim 8 wherein:
   the motion value indicates motion if the motion value equals a nonzero number; and
   the processor is operable to maintain the motion value equal to a nonzero number for the predetermined number of filler video images following the first filler video image if the motion value equals a nonzero number with respect to the first filler video image.

12. The image processing circuit of claim 8 wherein the processor is operable to generate the motion value by:
   generating a raw motion value for the first filler video image from the values of the original pixels of the first and second original video images; and
   filtering the raw motion value to generate the motion value.

13. The image processing circuit of claim 8 wherein:
   the first original video image comprises a first original video field having a polarity; and
   the second original video image comprises a second original video field having the same polarity as the first original video field.

14. The image processing circuit of claim 8 wherein the first original video image and the original video images following the first original video image compose a sequence of original video images that includes the second original video image and a third original video image located between the first and second original video images.

15. The image processing circuit of claim 8 wherein:
   the first original video image and the original video images following the first original video image compose a sequence of original video images that includes the second original video image and a third original video image located between the first and second original video images;
   the first original video image comprises a first original video field having a polarity;
   the second original video image comprises a second original video field having the same polarity as the first original video field; and
   the third original video image comprises a third original video field having a polarity opposite to the polarities of the first and second original video fields.

16. An image processing circuit, comprising:
   a processor operable to,
   receive first and second sets of pixel values for respective first and second groups of pixels in an original video image;
      generate direction values from the first and second sets of pixel values for a filler pixel of a filler video image;
      generate an initial value for the filler pixel based on the direction values; and
      combine the original and filler video images into a resulting video image in which the filler pixel is disposed between the first and second groups of pixels.

17. The image processing circuit of claim 16 wherein:
   the first and second groups of pixels each respectively include three horizontally aligned pixels;
   the pixels of the first group are vertically aligned with the respective pixels of the second group; and
   the filler pixel is vertically aligned with a center pixel of the first group and a center pixel of the second group in the resulting video image.

18. The image processing circuit of claim 16 wherein:
   the first and second groups of pixels each respectively include left, center, and right horizontally aligned pixels; and
   the processor is operable to,
      generate a first one of the direction values from the value of the right pixel of the first group and from the value of the left pixel of the second group,
      generate a second one of the direction values from the values of the right and center pixels of the first group and from the values of the left and center pixels of the second group,
      generate a third one of the direction values from the values of the center pixels of the first and second groups;
      generate a fourth one of the direction values from the values of the left and center pixels of the first group and from the values of the right and center pixels of the second group, and
      generate a fifth one of the direction values from the value of the left pixel of the first group and from the value of the right pixel of the second group.

19. The image processing circuit of claim 16 wherein the processor is operable to generate the value for the filler pixel from the pixel values from which the processor generates the smallest one of the direction values.

20. The image processing circuit of claim 16 wherein the processor is operable to generate the value for the filler pixel equal to the average of the pixel values from which the processor generates the smallest one of the direction values.

21. The image processing circuit of claim 16 wherein:
   the first and second groups of pixels each respectively include three horizontally aligned pixels;
   the pixels of the first group are vertically aligned with the respective pixels of the second group;
   the filler pixel is vertically aligned with a center pixel of the first group and a center pixel of the second group in the resulting video image; and
   the processor is operable to generate the value of the filler pixel equal to an average of the values of the center pixels if all of the direction values are greater than a predetermined threshold.

22. The image processing circuit of claim 16 wherein the processor is operable to:
   generate the value for the filler pixel equal to the average of the pixel values from which the processor generates the smallest one of the direction values if the smallest direction value is less than a predetermined threshold; and
   generate the value for the filler pixel equal to the average of predetermined ones of the pixel values if the smallest direction value is greater than the predetermined threshold.

23. The image processing circuit of claim 16 wherein the processor is operable to generate the direction values by calculating respective differences between pixel values in the first set and pixel values in the second set.

24. A method, comprising:
   generating an initial first pixel-value component from a value of an original pixel in an first original video image by executing an algorithm that corresponds to a direction of an edge that includes the original pixel;
   generating a second pixel-value component from a value of an original pixel in a second original video image;
   generating a value of a filler pixel from the first and second pixel-value components; and
   generating a resulting video image by combining the filler pixel and the first original video image.

25. The method of claim 24 wherein the second original video image follows the first original video image in a sequence of original video images.

26. The method of claim 24 wherein:
   the first original video image comprises an original field having a polarity; and
   the generating the resulting video image comprises,
      generating a filler field that includes the filler pixel and that has a polarity opposite to the polarity of the original field, and
      combining the original and filler fields.

27. The method of claim 24 wherein:
   the first original video image comprises a first original field having a polarity and including the pixel of the first original video image;
   the second original video image comprises a second original field having the same polarity as the first original field and including the pixel of the second original video image; and the generating the resulting video image comprises,
    generating a filler field that includes the filler pixel and that has a polarity opposite to the polarities of the first and second original fields, and
    combining the filler field and the first original field.

28. The method of claim 24 wherein:
the generating the initial first pixel-value component comprises generating the initial first pixel-value component equal to the value of the original pixel of the first original video image; and
the generating the second pixel-value component comprises generating the second pixel-value component equal to the value of the original pixel of the second original video image.

29. The method of claim 24, further comprising:
weighting the initial first and second pixel-value components; and
wherein the generating the value of the filler pixel comprises generating the value of the filler pixel from the weighted first and second pixel-value components.

30. The method of claim 24, further comprising:
generating a motion value from the values of the pixels of the first and second original video images;
generating from the motion value first and second weighting factors;
generating a weighted first pixel-value component by combining the first weighting factor and the initial first pixel-value component;
generating a weighted second pixel-value component by combining the second weighting factor and the second pixel-value component; and
wherein the generating the value of the filler pixel comprises generating the value of the filler pixel from the weighted first and second pixel-value components.

31. A method, comprising:
generating a motion value for a first filler video image from a value of a pixel in a first original video image and a value of a pixel in a second original video image; and
causing the motion value to indicate motion for a predetermined number of filler video images following the first filler video image if the motion value indicates motion for the first filler video image.

32. The method of claim 31 wherein the generating the motion value comprises generating the motion value equal to a difference between the values of the pixels of the first and second original video images.

33. The method of claim 31 wherein the predetermined number equals five.

34. The method of claim 31 wherein the causing comprises maintaining the motion value equal to a nonzero number for the predetermined number of filler video images following the first filler video image if the motion value equals a nonzero number to indicate motion for the first filler video image.

35. The method of claim 31 wherein the generating comprises:
generating a raw motion value for the first filler video image from the values of the pixels of the first and second original video images; and
filtering the raw motion value to generate the motion value.

36. The method of claim 31 wherein:
the first original video image and the original video images following the first original video image compose a sequence of original video images that includes the second original video image and a third original video image located between the first and second original video images;
the first original video image comprises a first original video field having a polarity;
the second original video image comprises a second original video field having the same polarity as the first original video field; and
the third original video image comprises a third original video field having a polarity opposite to the polarities of the first and second original video fields.

37. A method, comprising:
generating direction values for a filler pixel from the values of first and second groups of original pixels disposed in a progressive video image, the filler pixel disposed in the progressive video image between the first and second groups of original pixels; and
generating an initial value for the filler pixel based on the direction values.

38. The method of claim 37 wherein:
the first and second groups of pixels each respectively include three horizontally aligned pixels;
the pixels of the first group are vertically aligned with the respective pixels of the second group; and
the filler pixel is vertically aligned with a center pixel of the first group and a center pixel of the second group.

39. The method of claim 37 wherein:
the first and second groups of pixels each respectively include left, center, and right horizontally aligned pixels; and
generating the direction values comprises,
    generating a first one of the direction values from the value of the right pixel of the first group and from the value of the left pixel of the second group,
    generating a second one of the direction values from the values of the right and center pixels of the first group arid from the values of the left and center pixels of the second group,
    generating a third one of the direction values from the values of the center pixels of the first and second groups,
    generating a fourth one of the direction values from the values of the left and center pixels of the first group and from the values of the right and center pixels of the second group, and
    generating a fifth one of the direction values from the value of the left pixel of the first group and from the value of the right pixel of the second group.

40. The method of claim 37 wherein the generating the value for the filler pixel comprises generating the value for the filler pixel from the pixel values used to generate the smallest one of the direction values.

41. The method of claim 37 wherein the generating the value for the filler pixel comprises generating the value for the filler pixel equal to the average of the pixel values used to generate the smallest one of the direction values.

42. The method of claim 37 wherein:
the first and second groups of pixels each respectively include three horizontally aligned pixels;
the pixels of the first group are vertically aligned with the respective pixels of the second group;
the filler pixel is vertically aligned with a center pixel of the first group and a center pixel of the second group; and the generating the value of the filler pixel comprises generating the value of the filler pixel equal to an average of the values of the center pixels if all of the direction values are greater than a predetermined threshold.

43. The method of claim 37 wherein the generating the value for the filler pixel comprises:

generating the value for the filler pixel equal to the average of the pixel values used to generate the smallest one of the direction values if the smallest direction value is less than a predetermined threshold; and generating the value for the filler pixel equal to the average of predetermined ones of the pixel values if the smallest direction value is greater than the predetermined threshold.

44. The method of claim 37 wherein the generating the direction values comprises calculating respective differences between pixel values in the first set and pixel values in the second set.

45. The image processing circuit of claim 8 wherein the processor is operable to generate the motion value by:

generating a raw motion value for the first filler video image from the values of the original pixels of the first and second original video images; and filtering the raw motion value to generate the motion value equal to zero if the raw motion value is less than or equal to eight, equal to half the raw motion value minus four if the raw motion value is greater than eight and less than thirty eight, and equal to fifteen if the raw motion value is greater than or equal to thirty eight.

46. The image processing circuit of claim 8 wherein the processor is further operable to:

receive a value of an original pixel of a third original video image that follows the second original video image;

generate a second motion value for a second filler video image from the values of the original pixels of the second and third original video images;

compare the first motion value to the second motion value; and cause the first motion value to indicate motion for the second filler video image and for a second predetermined number of filler video images following the second filler video image if the first motion value has a predetermined relationship to the second motion value, the second predetermined number less than the first predetermined number; and cause the second motion value to indicate motion for the second filler video image and the first predetermined number of filler video images following the second filler video image if the first motion value does not have the predetermined relationship to the second motion value.

* * * * *

UNITED STATES PATENT AND TRADEMARK OFFICE
CERTIFICATE OF CORRECTION

PATENT NO. : 6,909,752 B2
DATED : June 21, 2005
INVENTOR(S) : Qinggang Zhou

It is certified that error appears in the above-identified patent and that said Letters Patent is hereby corrected as shown below:

Column 24,
Line 39, please replace "arid" with -- and --.

Signed and Sealed this

Twenty-third Day of August, 2005

JON W. DUDAS
*Director of the United States Patent and Trademark Office*